US009529813B2

(12) United States Patent
Jiang

(10) Patent No.: US 9,529,813 B2
(45) Date of Patent: Dec. 27, 2016

(54) COMPUTER-AIDED NUMERICAL CONTROL METHOD AND SYSTEM

(76) Inventor: Junfeng Jiang, Shenzhen (CN)

( * ) Notice: Subject to any disclaimer, the term of this patent is extended or adjusted under 35 U.S.C. 154(b) by 705 days.

(21) Appl. No.: 13/883,576

(22) PCT Filed: Aug. 4, 2011

(86) PCT No.: PCT/CN2011/078007
§ 371 (c)(1),
(2), (4) Date: May 5, 2013

(87) PCT Pub. No.: WO2012/058959
PCT Pub. Date: May 10, 2012

(65) Prior Publication Data
US 2016/0124981 A1   May 5, 2016

(30) Foreign Application Priority Data

Nov. 5, 2010   (CN) .......................... 2010 1 0536800

(51) Int. Cl.
*G06F 17/30* (2006.01)
*G05B 19/4093* (2006.01)

(52) U.S. Cl.
CPC ..... *G06F 17/30115* (2013.01); *G05B 19/4093* (2013.01); *G05B 2219/35167* (2013.01); *Y02P 90/265* (2015.11)

(58) Field of Classification Search
CPC ........................................... G05B 2219/50336
USPC ................................................. 700/187, 189
See application file for complete search history.

(56) References Cited

U.S. PATENT DOCUMENTS

2008/0058984 A1* 3/2008 Gray .................. G05B 19/4069
700/192

OTHER PUBLICATIONS

Humphreys, "An integrated computer aided engineering system for prototypes and tooling of automotive parts" Proceedings of the Institution of Mechanical Engineers, Part B: Journal of Engineering Manufacture Feb. 1983 vol. 197 No. 1 pp. 35-41.*

(Continued)

*Primary Examiner* — Mohammad Ali
*Assistant Examiner* — Emilio J Saavedra

(57) ABSTRACT

The invention discloses a computer-aided numerical control method and system, and changed the computer numerical control (CNC) to the computer-aided numerical control (CANC). Based on discrete geometry and discrete kinematics, the invention is constructed a technical solution of a related data flow file, it is completely solved the optimization of discrete position information and the axis smoothness. The invention is used to manufacture digital control information. Through the three-dimensional graphical interface, therefore completely achieved the software implementation for R&D of CNC technologies and reconfiguration of CNC systems, and is created an open platform for R&D of CNC technologies and CNC systems. The related data flow file, as a computer program product, will be commercializing digital control information, and then will be expediting a new industry namely digital control information manufacture industry.

8 Claims, 5 Drawing Sheets

(56) References Cited

OTHER PUBLICATIONS

Dhanik et al., "Contour parallel milling tool path generation for arbitrary pocket shape using a fast marching method" The International Journal of Advanced Manufacturing Technology Oct. 2010, vol. 50, Issue 9, pp. 1101-1111.*

Luo et al., "A universal velocity profile generation approach for high-speed machining of small line segments with look-ahead" The International Journal of Advanced Manufacturing Technology Dec. 2007, vol. 35, Issue 5, pp. 505-518.*

* cited by examiner

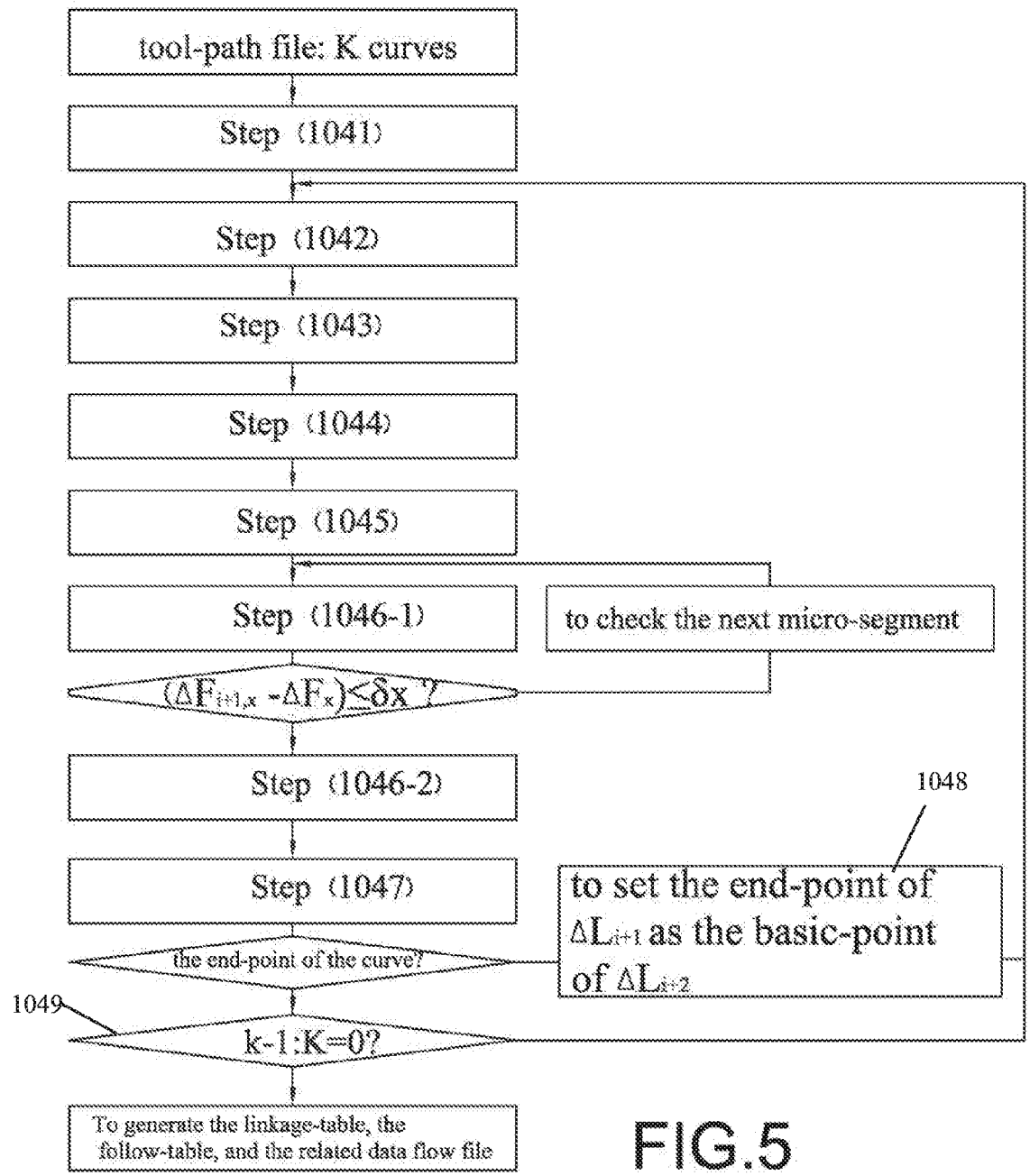

COMPUTER-AIDED NUMERICAL CONTROL METHOD AND SYSTEM

CROSS REFERENCE OF RELATED APPLICATION

This is a national phase national application of an international patent application number PCT/CN2011/078007 with a filing date of Aug. 4, 2011, which claims priority of a CHINA application number 201010536800.7 with a filing date of Nov. 5, 2010. The contents of these specifications, including any intervening amendments thereto, are incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates generally to advanced control and advanced manufacture, specifically to a computer-aided numerical control method and system for a new generation of control-machines. The present invention is used to manufacture related data flow file, thereby completely realized the software implementation for R&D (Research and Development) of computer numerical control technology and reconfiguration of computer numerical control system, so as to create an open platform for R&D of computer numerical control technology and computer numerical control system. The related data flow file, as a computer program product, will be commercializing digital control information (numerical control information), and then will be expediting a new industry namely digital control information manufacture.

Description of Related Arts

Ever since 1952 MIT developed the first electronic tube numerical control system, after times of transistors, integrated circuits, minicomputers and microcomputers, the computer numerical control (CNC) is developed into PC-based open architecture control (OAC) in the eighties of the last century, which has three modes: PC embedded in NC, NC embedded in PC, and soft-open.

The OAC is considered to be the key technology of high-performance and intelligent control. NC embedded PC mode, i.e. an open numerical control system based on motion controller is the mainstream of existing open numerical control systems, motion controllers has became a high-tech industries and swept the world. An open motion controller is known as the new generation of industrial controllers in the United States, and is considered to be the future of a third industrial revolution in Japan.

In a general sense, the architecture of the modern manufacturing system can be abstracted into three systems, namely power-machine, work-machine and control-machine. The power-machine provides energy, the control-machine sends control information to the power-machine and the work-machine, and the work-machine manufacture products.

A sign of a first industrial revolution was birth of the work-machine, machinery instead of hand tools.

A sign of a second industrial revolution was birth of the power-machine, such as a steam engine, internal-combustion engine, and motor, instead of humans and animals.

The third industrial revolution will be birth of a control-machine, as a main indicator.

From a manufacturing industry point of view, the above division is logical.

In a manufacture system, the CNC system plays the role of the control-machine. However, because there exist serious defects in openness, reconfiguration, standardization, and software implementation of numerical control technologies, the existing CNC system is not compared with the power-machine and the work-machine, and is difficult to become the control-machine that is expected for the third industrial revolution.

The "Technical Committee of Open Systems" of IEEE defines an open system as follows: "An open system provides capabilities that enable property implemented applications to run on a variety of platforms from multiple vendors, interoperate with other system applications and present a consistent style of interaction with the user" (IEEE 1003.0).

The Chinese National Standard "GB/T 18759.1-2002 mechanical and electrical equipment•open CNC systems—Part 1: General Principles•3.1" seizes the nature of the IEEE definition and follows its basic principle, the openness is straightforwardly defined as "plug-and-play" of application software, its definition of the open CNC systems is as follows: "An open CNC system runs on a system platform constructed according to the principles such as the publicity, scalability and compatibility, and possess the portability, interoperability and consistency of human-machine interface."

The IEEE-definition shows that the IEEE defines a CNC system as a special purpose-computer system. Therefore, the architecture of the open CNC systems is divided into two categories, i.e. a system platform and an application software platform. It is the architecture oriented application software. Therefore, the application software is divided into the man-machine control level and the motion control level. The motion control level is used to execute a real-time control process, and inextricably to link with a specific iterative interpolation control algorithm, which is a kernel of the CNC system.

As a result, under the leading of the IEEE-definition, operation rules in iterative interpolation, algorithms are tightly coupled together with task schedule rules in a real-time operating system, it forms a real-time CNC method namely the iterative interpolation method.

The iterative interpolation control method runs through the entire history of the numerical control method and system, and create the "the interpolation era" of the existing CNC systems.

The basic technical solution of the iterative interpolation control method is as follows. The method is based on a real-time operating system. The time-sharing cycle in the real-time operating system is an interpolation period. For a given tool-path and feedrate (F), by using an iterative interpolation algorithm, the digital control information concerning relevant axes is real-time calculated, and is in real-time sent to motion control systems (step-type motion control system or servo-type motion control system) that is used to control a deterministic motion relationship in a mechanical system. The digital control information includes discrete position information concerning relevant axes, and associated information between the discrete position information.

As is known, when solving multi-axes increments for a tool-path, an interpolation algorithm is an iterative algorithm in the numerical calculation. The so-called iterative interpolation algorithm, in essence, is to obtain a set of operation rules on $X_{n+1}$ from $X_n$. Because of function continuity, $X_n$ certainly imply some information on $X_{n+1}$. To fully use of these informations can be simplified a high-order complex operation into a low-order simple operation, and led to greatly improve the speed of the iterative interpolation algorithm. So as to avoid high-order complex operations, some optimal iterative interpolation algorithms cannot be adopted. On the other hand, to obtain operation rules on $X_{n+1}$ from $X_n$, in general, is too difficult for some complex tool-paths. Therefore, an iterative interpolation algorithm with the high-speed and high-precision becomes the core of existing CNC method.

The present invention discovered that the iterative interpolation control method has the following four essential characteristics.

1. In order to improve a feedrate (F), the existing open CNC systems must be use time-divided method.

For a straight-line of the length of L, according to the feedrate (F) and the interpolation period (T), the time-divided method must be discrete the straight-line into some line-segments $\Delta L_i$: $\Sigma \Delta L_i = L$, $\Delta L_i = FT$.

As is known, for the straight-line, as long as given F, the machining task can be completed. However, because the interpolation period lead to real-time iteration, the above formula shows that the linear interpolation had to be discrete the straight-line into many line-segments.

For the circular interpolation, the time-divided method first uses a number of line-segments to approximate a curve: $\Delta L_i = FT$, which is called a rough interpolation, and then a fine interpolation. The formula: $e_r = (TF)^2/(8r)$ gives the relationship between the discrete error ($e_r$), the federate (F), the interpolation period (T), and curvature radius (r).

The formula also pointed out that $e_r$ is proportional to the square of F and T, and is inversely proportional to r. The growth of F and/or T lead to exponential growth of $e_r$, in other words, $e_r$ is highly sensitive to the time, the feedrate and the curvature.

Therefore, for the iterative interpolation control method, time was locked by the interpolation period, and is no longer a controllable external free variable, but a uncontrollable internal system parameter.

This is the first essential characteristic of the iterative interpolated control method, and is also its endogenous basic defect.

2. In the interpolation period, on the one hand, the iterative interpolation algorithm generates digital control information, which immediately are in real-time sent to the motion control system to drive the corresponding axes. On the other hand, the digital control information, as the input in next interpolation period, are in real-time feed backed to generate next digital control information. This is a real-time iteration of digital control information.

To follow beats of the interpolation period, the digital control information are generated, sent and executed periodically, so again and again. This is a real-time iteration of control process.

Therefore, through the real-time iterations of digital control information and control process (denoted by I&P real-time iteration), the overall manufacturing process of the digital control information is real-time.

This is the second essential characteristic of the iterative interpolated control method, and is also its endogenous basic defect.

3. The I&P real-time iteration is a centralized control mode based on real-time operating system. For this control mode, "have absolute control on major issues, grasp at authority on minor ones, carry right down to the grass roots level", the real-time operating system command all, plan, design, and construction are at the same time.

This is the third essential characteristic of the iterative interpolated control method, and is also its endogenous basic defect.

4. The discrete error $e_r$ is inversely proportional to r, and is proportional to the square of F and T. However, a workpiece-contour is only a geometry problem, so a tool-path, $e_r$ and r are also a geometry problem. F of the tool center is only a problem concerning the machining process and kinematics and/or dynamics of the electromechanical system.

The iterative interpolation control method tightly coupled together such as $e_r$, r, T, and F, i.e. space, time, velocity, acceleration/deceleration, and even jerk. This means that the iterative interpolation algorithm is strongly correlative with the geometry structure of a tool-path, hereby the geometry characteristics of the tool-path, the characteristics of the machining process, and the kinematics/dynamics characteristics of the mechanical system all tightly coupled together. The coupling relationship between the time and the space of a tool-path can be simply called as the time-space coupleness.

This is the fourth essential characteristic of the iterative interpolated control method, and is also its endogenous basic defect.

The present invention found that the IEEE-definition produced the following five serious deviations, and misled development direction of the CNC method and the CNC system.

1). The Existing CNC Systems are Computerized by the IEEE-Definition

From a historical point of view of development of the computer and its applications, the multi-task operating system was an epoch-making progress, which is used to time-sharing run programs of many users. However, in essence, the multi-task operating system just provides a management mechanism for internal/external resources and an adjustment mechanism for internal/external environmental changes.

Under the leading of the IEEE-definition, the iterative interpolation control method developed the management mechanism and the adjustment mechanism in the real-time operating system as a universal control mechanism. The real-time operating system has become a real-time control center to be used in real-time to generate the digital control information through the iterative interpolation algorithm, further the architecture of the existing CNC system is based the real-time operating system. It is lead to the overall CNC application software becoming a large and complex interrupt system. Thus, the existing CNC system is completely "computerized", and became a special-purpose computer system needed to arrange a real-time operating system.

2). The IEEE-Definition Produced a Series of Pseudo-Problems, Hereby LED to the Complexity of the Existing CNC Method and CNC System The existing CNC systems are fully computerized by a real-time operating system. The many technical problems became key problems, such as interpolation-speed and interpolation-precision of the iterative interpolation algorithm, multi-axes linkage, real-time forward-look control of F, acceleration/deceleration control, high-speed pretreatment of CNC programs, cross-coupling control, etc. The above technical problems are completely pseudo-problems, which are produced by the above four endogenous basic defect of the iterative interpolation control method, thereby artificially led to the complexity of the existing CNC method and system.

3). The IEEE-Definition Reinforces the Real-Time of the Overall Control Process

In the CNC system, the so-called real-time means that some real-time tasks have strict requirement in terms of the time, hence these tasks must be implemented in the predictable time. The real-time is the premise to implement real-time control, the interpolation-speed of the iterative interpolation algorithm is an important condition for control stability. The iterative interpolation algorithm is a core to generate control information in real-time, in essence, its interpolation-speed and interpolation-precision determine the overall system performance and reliability.

For the work-machine (in the present invention, simply, the work-machine includes the power-machine and its motion control system), the real-time control task is to send the discrete position information on relevant axes into the motion control systems by F, so that the movements of relevant axes are used to implement compositive displacements.

Under the leading of the IEEE-definition, the iterative interpolation control method uses a centralized control mode of "planning, design, and construction are at the same time". The overall manufacturing process of the digital control information is a real-time through the I&P real-time iteration, therefore the real-time of the control process is reinforced.

4). The IEEE-Definition Hindered the Standardization of the Prior CNC Systems

The open architecture is considered to be the key technology of high-performance and intelligent control. In the natural sciences, unlike a closed system (also known as a conservative system), an open system is that its matter, energy and information exchange with the external environment.

In the computer field, the basic meaning of the openness is plug and play of application software.

However, the openness is a concept in the humanistic field only sensed but not spoken. More importantly, the CNC is a process, not an object. The openness of a process is completely different with the openness of an object. Therefore, in the CNC field, for nearly three decades, the content on the openness has not been able to be uniformed and regulated.

As is well known, the standardization of parts and components is the lifeline of modern manufacturing. The CNC systems are complex systems composed of many subsystems, which are also complex systems. For a machine, a part or component is similar with a sub-system, and can even be said that a subsystem is a "part" of the complex system. In a CNC system, if subsystems and interfaces therebetween are standardized, and have interchangeability, obviously, then the CNC system is open.

In the engineering field, the aim, effect, and methods of the openness and standardization are very close. The standardization necessarily implies the simplicity in means of the use, maintenance, and user's secondary development.

Energy and matter is a commodity, information is also a commodity. The main aim of the openness and standardization is to obtain the liquidity in the commodity significance for the digital control information.

For CNC, the basic content of the openness is the standardization in means of the digital control information, digital control information manufacturing process and internal interface in the process. The architecture of the CNC system, its hardware and software resources are necessary to meet the needs of large-scale industrial production in the information industry, and to provide standardized control-machines for work-machines and power-machines.

It can be seen, during the development process of information manufacturing, to adapt the standardization of work-machines and power-machines, the development of the manufacturing environment requires to standardize digital control information and CNC systems, that embodies the openness of the CNC system. The essence of the openness is that the manufacturing system of digital control information can be changed from a rigid system to a flexible system. It is necessary to lead the standardizations in means of the digital control information, digital control information manufacturing process and internal interface in the process.

As a result, the present invention defined the CNC system openness as: the openness of CNC system is the standardization of CNC system in the flexible course, i.e. the standardization of the digital control information, the process to manufacture digital control information, and the internal interface in the process.

From the foregoing definition it can be clearly seen, the so-called openness is a problem of how to realize the standardizations of the digital control information, the process to manufacture digital control information, and the CNC system. This definition is expected, but also fully understood, not ambiguous, by the manufacturing industry. This definition laid an open operable platform, and also pointed out the direction for how to realize standardization of CNC system.

Under the lead of the IEEE definition, the existing CNC systems were computerized, the openness is limited to "plug and play" of the application software. It completely ignored the technical features of CNC in the overall control process, and led to the prior CNC system's loss of the proper direction, and further hindered the standardization course of CNC systems.

5). The IEEE-Definition Misled the Development Direction of CNC Technologies

The iterative interpolation algorithm with high-speed and high-precision is the core technology in the existing CNC systems. Therefore, the OSEC (Open System Environment for Controller) project in Japan thought that an open CNC system without advanced control algorithms is only evolutionary, not ideal and revolutionary.

So-called algorithm, briefly said, is a method computer-based to solve some problems. The ACM defines computer science as fellow: computer science researches the process of algorithm to describe and transform information. Algorithms and their implementation process are the foundation of computer science.

The iterative interpolation control method led to the development of CNC to advanced iterative interpolation algorithms, it is bound to concern in the core of computer science.

From an information theory point of view, the CNC system is only used to decompress the digital control information compressed in a tool-path and F.

Under the control of a real-time operating system, the iterative interpolation control method, as a decompression method for digital control information, is real-time. The core of the real-time operating system is the process/thread scheduling. The real-time led to complicate the process/thread scheduling. Parallel algorithm led further to complicate the process/thread scheduling. As compared with the pipeline concurrency at instruction-level and process scheduling concurrency at processor-level, the uncertainty resulted from the thread concurrency is extremely complex.

The task scheduling of a real-time operating system seriously restricts the performance of the overall system. In order to implement a very complex process/thread scheduling, the CNC software goes deep into the real-time operating system's front fields such as multi-process and/or multi-thread multi-nested calls and real-time multi-nested interrupts. Therefore, speed and precision of the iterative interpolation control algorithms become the key technical indicators of the existing CNC systems.

The problem is that if F of the work-machine is improved, or the movement precision is improved, and the number of linkaged-axes and/or the linkaged-parameters is increased, then the interpolation period is longer exponentially. It requires a CPU with more bits and higher speed, a real-time operating system with more bits and more hard the real-time, and a more advanced iterative interpolation algorithm.

Therefore, on the one hand, the operation rules in iterative interpolation algorithms and the task scheduling rules in real-time operating systems are coupled tightly in real-time together by the IEEE-definition, the development direction of CNC technology is led to forefront fields in the algorithm theory and the operating system. On the other hand, CNC technology and chip technology are bundled together by the IEEE-definition, this means that developments of the existing CNC technology depend on CPU's speed, in another word, in essence on chip technology.

The inventor invented the data flow related control (DRC) method in the patent "A data flow related control method and architecture for computer numerical control system" (ZL 2007 1 0124304.9, date of grant: Aug. 19, 2009), the existing CNC systems have bid farewell to the interpolation era, and have strided into the DRC era. A control-machine, i.e. the DRC-based control-machine was born.

In the CNC field, "1"/"0"-type discrete position information are widely used. However, in many cases, discrete position information are not "1"/"0"-type, but to increments. A related data flow with "1"/"0"-type discrete position information commonly is called as the step-type related data flow, and then a related data flow with increments is called as the increment-type related data flow.

TABLE 1

| $t_1$ | $t_2$ | ... | $t_i$ | ... | $t_n$ |
|---|---|---|---|---|---|
| $\Delta X_1$: 1 | $\Delta X_2$: 1 | ... | $\Delta X_i$: 1 | ... | $\Delta X_n$: 1 |
| $\Delta y_1$: 0 | $\Delta y_2$: 1 | ... | $\Delta yi_i$: 0 | ... | $\Delta y_n$: 1 |
| $\Delta Z_1$: 1 | $\Delta Z_2$: 0 | ... | $\Delta Z_i$: 1 | ... | $\Delta Z_n$: 0 |
| $\Delta A_1$: 1 | $\Delta A_2$: 0 | ... | $\Delta A_i$: 0 | ... | $\Delta A_n$: 1 |
| $\Delta B_1$: 1 | $\Delta B_2$: 1 | ... | $\Delta B_i$: 1 | ... | $\Delta B_n$: 0 |

The Table 1 is a 5-linkaged step-type related data flow of a tool-path with 5 axes, the tool-path is a function of variables X, y, Z, A, B, where time T is discreted into n time points: $t_i$ (i=1, ... , n), the value is "1" at each $t_i$ for the axis(X), and is "1" or "0" at each $t_i$ for the other four-axes.

Thus, the digital control information consists of two parts. The first part is discrete position information such "1" or "0" as for five-axes(X, y, Z, A, B) at each time point $t_i$, and the linkageness therebetween, which are used to produce synthetic displacements. The second part is the followness between the synthetic displacements, i.e. time intervals between the adjacent synthetic displacements, which are used to determine F.

TABLE 2

| $t_1$ | $t_2$ | ... | $t_i$ | ... | $t_n$ |
|---|---|---|---|---|---|
| $\Delta X_1$: 1 | $\Delta X_2$: 1 | ... | $\Delta X_i$: 1 | ... | $\Delta X_n$: 1 |
| $\Delta y_1$: 0 | $\Delta y_2$: 1 | ... | $\Delta yi_i$: 0 | ... | $\Delta y_n$: 1 |
| $\Delta Z_1$: 1 | $\Delta Z_2$: 0 | ... | $\Delta Z_i$: 1 | ... | $\Delta Z_n$: 0 |
| $\Delta A_1$: 1 | $\Delta A_2$: 0 | ... | $\Delta A_i$: 0 | ... | $\Delta A_n$: 1 |
| $\Delta B_1$: 1 | $\Delta B_2$: 1 | ... | $\Delta B_i$: 1 | ... | $\Delta B_n$: 0 |
| $W_1$ | $W_2$ | ... | $W_i$ | ... | $W_n$ |
| $E_1$ | $E_2$ | ... | $E_i$ | ... | $E_n$ |
| $H_1$ | $H_2$ | ... | $H_i$ | ... | $H_n$ |

The Table 2 is a 8-linkaged step-type related data flow with 3 parameters (for example, W is the width 0f the laser pulse, E is the energy of the laser pulse, H is the frequency 0f the laser pulse) and the five axes, where the values of W, E, H are different by real-time control at $t_i$.

TABLE 3

| $\Delta t_1$ | $\Delta t_2$ | ... | $\Delta t_i$ | ... | $\Delta t_n$ |
|---|---|---|---|---|---|
| $\Delta X_1$ | $\Delta X_2$ | ... | $\Delta X_i$ | ... | $\Delta X_n$ |
| $\Delta y_1$ | $\Delta y_2$ | ... | $\Delta y_i$ | ... | $\Delta y_n$ |
| $\Delta Z_1$ | $\Delta Z_2$ | ... | $\Delta Z_i$ | ... | $\Delta Z_n$ |
| $\Delta A_1$ | $\Delta A_2$ | ... | $\Delta A_i$ | ... | $\Delta A_n$ |
| $\Delta B_1$ | $\Delta B_2$ | ... | $\Delta B_i$ | ... | $\Delta B_n$ |
| $\Delta W_1$ | $\Delta W_2$ | ... | $\Delta W_i$ | ... | $\Delta W_n$ |
| $\Delta E_1$ | $\Delta E_2$ | ... | $\Delta E_i$ | ... | $\Delta E_n$ |
| $\Delta H_1$ | $\Delta H_2$ | ... | $\Delta H_i$ | ... | $\Delta H_n$ |

The Table 3 is a 8-linkaged increment-type related data flow with 5 axes and 3 parameters, the tool-path is a function of variables X, y, Z, A, B, where T is discreted into the n intervals: $\Delta t_i$ (i=1, ... , n); $\Delta X_i$, $\Delta y_i$, $\Delta Z_i$, $\Delta A_i$, $\Delta B_i$ are increments of X, y, Z, A, B; $\Delta W_i$, $\Delta E_i$, $\Delta H_i$ are parameter changes of W, E, H during $\Delta t_i$ (i=1, ... , n).

Thus, the digital control information consists of two parts. The one is increment information concerning the relevant axes and/or virtual axes and linkageness therebetween, that is the L-division $\Delta L_i$(i=1, ... , n) that is used in real-time to control the synthetic displacements and to produce five-axes linkage, and in real-time to control parameter-changes during $\Delta t_i$. The other is $\Delta t_i$ and the followness between the adjacent synthetic displacements, that is the T-division $\Delta t_i$ (i=1, ... , n). For a curve, the L-division is a increment-type related data flow which is a sequence of consecutive micro-segments which maximum normal distance from the tool path is less than or equal to a discrete scale.

IT can be seen clearly from the foregoing Tables, the basic problem of CNC is to manufacture the related data flow.

For the increment-type related data flow, the first basic problem is how to plan the micro-segments $\Delta L_i$ in the L-division $\Delta L_i$ (i=1, ... , n) according a given discrete error and optimization goals, and to control the relevant axes to move their increments during $\Delta t_i$, and to composite the micro-segment $\Delta L_i$, briefly, that is to solve the linkageness of the L-division.

The second basic problem is how to control F of the relevant axes during $\Delta t_i$, and to determine the T-division, briefly, that is to solve the followness of the L-division.

For DRC, the linkageness of the L-division concerns only in the increments of relevant axes. This is different from the iterative interpolation control method. The linkageness of the L-division is purely a discrete geometry problem, which is independent of the discrete algorithm and/or interpolation algorithm, and the discrete process to generate the increment-type related data flow. The followness of L-division concerns in F and kinematics/dynamical characteristics of the axes, in essence, it is independent of geometry structure of tool-path.

For DRC, the manufacturing process of the related data flow is a non-real-time planning process, therefore is independent of real-time operating system. This is different from the iterative interpolation control method.

Obviously, compared with the step-type related data flow, to manufacture the increment-type related data flow is much more complex. On the one hand, it is to optimize the L-division $\Delta L_i$ (i=1, . . . , n), which is called the discrete geometry planning; on the other hand, it is to optimize the T-division $\Delta t_i$ (i=1, . . . , n) concerning the axis smoothness, which is called the discrete kinematics planning.

Therefore, by means computer-aided, the discrete geometry planning and the discrete kinematics planning to be used to manufacture the increment-type related data flow is the primary task for the DRC-based control-machine.

SUMMARY OF THE PRESENT INVENTION

The invention is advantageous in that it provides a purpose of the DRC to comprise a based-PC control-machine for the third industrial revolution. It has soft-reconfiguration, high-speed, high-precision, high-reliability, standardization, and all openness on control information, control method, architecture, control process and interface therebetween, and is adaptable to needs of the third industrial revolution for CNC systems.

The computer simulation has become one of the most profound influences and the most widely used in computer applications. The deterministic motion relationship of two-axes, triaxial-axes and even multi-axes in mechanical system, can be show their movement process by visual image through three-dimensional graphical interface with a good man-machine interface. CAD, CAM, CAPP, CAE are widely used in the advanced manufacture field.

Another advantage of the invention is to propose a computer-aided numerical control method and system to be used to manufacture an increment-type related data flow through three-dimensional graphical interfacing. Therefore the present invention completely achieved software implementation for R&D of CNC technology and reconfiguration of CNC system, and is created an open platform for R&D of the DRC-based control-machine.

A computer-aided numerical control method, comprising related data flow file planning (1) to be used to manufacture a related data flow file, the comprising related data flow file planning (1) further comprising:

discrete coordinate system planning (101), which is configured to establish a discrete coordinate system by griding coordinate planes by a set of equidistance line, therein the distance between the lines is equal a given discrete scale;

tool-path planning (102), which is configured to divide a tool-path into K curves according to feature points of the tool-path, to determine a drive-axis and linkage-axes, and to generate a tool-path file for each curve of the K curves;

discrete geometry planning (103), which is configured to generate the intrinsic L-division for each curve in the tool-path file;

discrete kinematics planning (104), which is configured to generate the T-division for the intrinsic L-division; and related data flow file planning (105), which is configured to generate a linkage-table file for the intrinsic L-division and a follow-table file for the T-division in a storage space by a data format, and to link the both as a related data flow file.

Further, the method comprising:

control flow file planning (2), which is configured to plan a control flow to control switch devices, and to generate a control flow file in a storage space according to a data format and a machining process given by a user;

data control flow file planning (3), which is configured to link the control flow file with the related data flow file, and to generate a data control flow file by a given data format and a machining process given by a user; and miscellaneous functions planning (4), which is configured to operate miscellaneous functions on running states, such as manually and automatically sets, specified program segment, simulation and display 0f the tool-path, sending the data control flow file through an interface.

Further, the discrete geometry planning (103) to be used to generate the intrinsic L-division, further comprising:

(1031) setting optimization goals for a curve to taken out from the K curves in sequence;

(1032) generating the neighborhood of the start-point of the curve, therein the start-point is defined a basic-point;

(1033) determining a lead-point in the neighborhood of the basic-point according to one of the optimization goals, and to calculate the increment between the lead-point and the basic-point;

(1034) generating the line-segment between the lead-point and the basic-point;

(1035) judging whether the line-segment for a micro-segment of the curve;

(1036) if the line-segment is the micro-segment of the curve, then to return to the step (1033);

(1037) if the line-segment is not the micro-segment of the curve, then the previous lead-point of the lead-point is the end-point of the micro-segment, and the increment that is between the previous lead-point and the basic-point is the increment of the micro-segment; and (1038) setting the previous lead-point as the basic-point of the next micro-segment, and generating the next micro-segment by executing the step (1032) to the step (1037), until generating the intrinsic L-division of the curve.

Further, the step (1035) comprising:

(1035-1) generating the neighborhood of the line-segment according to the orientation of the curve; and (1035-2) judging whether the neighborhood of the line-segment for a subset of the neighborhood of the curve; if the neighborhood of the line-segment belong to the subset, then the line-segment is the micro-segment of the curve.

Further, the optimization goals in the step (1031) are the shortest distance, the smallest discrete error, and the optimization of tolerance and fit.

Further, the discrete kinematics planning (104) to be used to generate a T-division, further comprising:

(1041) checking F given by a user;

(1042) generating the intrinsic L-division for a curve in the K curves by executing the discrete geometric planning (103), therein the intrinsic L-division satisfies the optimization goals;

(1043) generating the T-division of the intrinsic L-division by calculating $F_{i,y}$ according to F and the slope of $\Delta L_i$ to generate $\Delta t_i$, therein $\Delta t_i = \Delta L_{i,y}/F_{i,y}$ and $\Delta t_i \geq \Delta t_{min}$;

(1044) setting reference values of $\Delta F_x$ and $\Delta F_y$, and their deviations $\delta_x$, $\delta_y$;

(1045) checking constraint condition (a) of the axis smoothness: $(\Delta F_{i+1,y} - \Delta F_y) \leq \delta_y$; if the constraint condition (a)

does not satisfied, then to adjust F, and to re-plan the T-division according to the adjusted F;

(1046) checking constraint condition (b) of the axis smoothness: $(\Delta F_{i+1,x} - \Delta F_x) \leq \delta_x$; if the constraint condition (b) does not satisfied, then to increase $\Delta t_{i+1}$ to satisfy the constraint condition (b); if increasing $\Delta t_{i+1}$ can also not satisfy the constraint condition (b), then to reduce the $\Delta L_{i+1,x}$ to satisfy the constraint condition (b);

(1047) calculating $\Delta L_{i+1,x}$ and $\Delta L_{i+1,y}$ to adjust $\Delta t_{i+1}$ and $\Delta L_{i+1}$;

(1048) setting the end-point of $\Delta L_{i+1}$ as the basic-point of $\Delta L_{i+2}$, and executing the step (1041) to the step (1047) for the curve, until arriving the end-point of the curve; and (1049) executing the step (1041) to the step (1048) for each curve in the K curves.

Further, the related data flow file planning (105) comprising: compensating deterministic errors, which is configured to modify the linkage-table and the follow-table according to the deterministic errors of the mechanical system, and to compensate the deterministic errors.

Further, the number of the axes in the discrete coordinate system is two or more.

Further, wherein at least one axe is a virtual axe, which is defined a switch to control parameters.

Further, the discrete coordinate system is the non-orthogonal discrete coordinate system.

Further, the related data flow is a step-type related data flow.

A computer-aided digital control system, comprising:

a hardware platform, a software platform, and a application software system;

the hardware platform and the software platform are based-PC;

the application software system comprising:

a discrete coordinate system planning module, is used to establish a discrete coordinate system by gridding coordinate planes by a set of equidistance line, there the distance between the lines is equal a given discrete scale;

a tool-path planning module, is used to divide a tool-path into K curves according to feature points of the tool-path, and to determine a drive-axis and linkage-axes, and to generate a tool-path file for each curve of the K curves;

a discrete geometry planning module, is used to generate the intrinsic L-division for each curve in the tool-path file;

a discrete kinematics planning module, is used to generate the T-division for the intrinsic L-division; and a related data flow file planning module, is used to generate a linkage-table file for the intrinsic L-division and a follow-table file for the T-division in a storage space by a data format, and to link the both as a related data flow file.

Further, the application software system comprising:

a control flow planning module, is used to plan a control flow to control switch devices, and to generate a control flow file in a storage space according to a data format and a machining process given by a user;

a data control flow file planning module, is used to link the control flow file with the related data flow file, and to generate a data control flow file by a given data format and a machining process given by a user; and a miscellaneous function planning module, is used to operate auxiliary functions on running states, such as manually and automatically sets, specified program segment, simulation and display Of the tool-path, sending the data control flow file through an interface.

Further, the software platform is built on top of the middleware, and adopts application programming interface (API).

Further, the application software system comprising: a 3D graphics library.

As compared with prior technology, to clearer describe the prominent substantive feature and the notable progress of the present invention, the history of development of CNC system is listed as in the table 4.

TABLE 4

| | | |
|---|---|---|
| the Interpolation Era method: IIC products: NC device, CNC system | first | In 1952, tube's NC device |
| | second | the fifties of last century, transistor's NC device |
| | third | the early sixties of last century, IC's NC device |
| | fourth | the late sixties of last century, CNC (minicomputers) |
| | fifth | the seventies of last century, CNC (microcomputers) |
| | sixth | since the eighties of last century, PC-based CNC |
| the Data Flow Era method: DRC products: control-machine | first | data flow related control method |
| | second | CANC |

The above table summarizes the history of the development of CNC system, and shows the development trend of the control-machine, further describes that the originality and the beneficial effects of the present invention.

1. The table 4 show that a history of development of existing CNC system can be divided into two stages. The first stage was the hardware logic control stage, including tube's hardware logic, transistor's hardware logic, and IC's hardware logic, the products are generally referred to as NC device. The second stage is called CNC's stage, wherein the computers were the minicomputer, microcomputer and personal computer, and the products are generally referred to as CNC system. The NC device was used the iterative interpolation control method. For the CNC system, the IEEE definition tightly coupled together operation rules in iterative interpolation control algorithms with task schedule rules in real-time operating systems, and formed a real-time control method. The iterative interpolation control is a common technical feature for NC devices and existing CNC systems, therefore the interpolation era was born.

The DRC-based control-machine is used the data flow related control method, to bid farewell to the interpolation era, into the data flow related control era.

For the related data flow, the present invention discloses a non-coupleness of time-space structure of the tool-path, and decouples the discrete geometric structure of the tool-path with characteristics of machining process, and kinematics/dynamics characteristics of motion control systems. With the help of computer-aided, as a result of implement of the discrete geometry planning and the discrete kinematics planning for the tool-path, the digital control information is open, the manufacturing method of digital control information is open, the whole control process is open of digital control information, the interfaces between sub-processes such as discrete process of digital control information, distributing/sending process of digital control information, and executing process of digital control information, are also open. Therefore, the present invention has developed the computer numerical control (CNC) to the computer-aided numerical control (CANC), and achieves a leap from the CNC era to the CANC era.

2. Under leading of the IEEE definition, the architecture of existing CNC systems is similar to the Ptolemaic architecture in history, the both are due to a wrong idea.

In existing CNC system, the wrong idea led to a lot of redundant information such as the interpolation period and the contour-step, and artificially created a number of endogenous defects and derived a series of pseudo-problems, existing NC technology and existing CNC system are highly complicated, a series of obstacle are set for openness and standardization of the CNC system, the existing CNC system cannot evolve into a control-machine expected to in the third industrial revolution.

The present invention subverted the IEEE definition, the many of key techniques in existing CNC system, such as the real-time of real-time operating system, the interpolation speed and interpolation precision of interpolation algorithm, the multi-axes linkage, the real-time control of process parameters, real-time feedrate forward-look control, acceleration/deceleration control, and so on, are simplified into the conventional techniques in the CNC technology, it is will significantly promote the popularity of CNC technology and CNC system.

3. The CANC found that the core task of CNC technology is to manufacture digital control information of the tool-path, i.e. to plan the L-division and the T-division of the tool-path.

The L-division includes the displacement information of relevant axes and required linkageness, it is used to control the relevant axes to produce the required compositive displacements, and reflects the discrete geometry feature of the tool-path. The T-division includes feedrate information of relevant axes and required followness, it is used to control the time interval between the adjacent compositive displacements, and reflects the process characteristics of the tool-path.

The L-division, which involves discrete geometry structure of the tool-path, is a discrete geometric planning problem. The T-division, which involves feedrate jumps, is a discrete kinematics planning problem.

The CANC implements linkage of the relevant axes to produce compositive displacements by means of the linkage-table, and continuously implements the compositive displacements by means of the follow-table, that is, controls the feedrate. Therefore, the CANC completely achieved the software implementation for CNC technology.

4. The CANC system is based on PC, so it is open, and it is an open platform for research and development of CNC technology.

5. Due to the limitation of the interpolation period, many optimization algorithms cannot be used in existing CNC system, therefore the digital control information is not optimal. In the present invention, based on computer-aided, the optimization goals of a user are unrestricted, according to different optimization goals, various numerical calculation methods (including the interpolation algorithm) can be used to generate digital control information of the tool-path.

On the other hand, existing CNC systems regard the tool-path as the Euclidean curve. However, due to the feed directions of the axes are constrained, the space loss of the isotropic, resulted a symmetry breaking, and the tool-path is no longer a Euclidean space.

The CANC found that the tool-path are not an Euclidean curve, the L-division of the tool-path must take into account the structure factor $G_{i,y}$ of the linkage-axis at the point ($x_i$, $y_i$), and to eliminate non-European errors of the tool-path. In the present invention, the discrete geometry planning is based on discrete geometry. In accordance with the optimization goals such as the shortest distance, the smallest discrete error, the optimization of tolerance and fit etc., the discrete geometry planning is used to construct an intrinsic L-division under guiding point-by-point by means of lead-points, which met the optimization goals, and corrected non-European errors of the tool-path, therefore completely solved optimization problem of the L-partition.

6. After reconfiguration of a work-machine, the motion relationship between the axes is changed. In the present invention, the change of the motion relationship only involves the system parameters of the discrete coordinate system, it is not a substantive impact on hardware and software platforms of the CANC system, as well as the entire manufacturing process of the increment-type related data flow. Therefore, in the present invention, the software implementation for the reconfiguration of the DRC-based control-machine is completely solved.

7. In the present invention, the CANC system is a key component of the DRC-based control-machine. The CANC system is based on PC, and is a standardized.

Therefore, the present invention has laid a solid foundation for the standardization of the digital control information, the manufacturing process of the digital control information and interfaces therebetween.

8. Statistical data point out that, for the factors affecting the reliability of computer systems, hardware error accounts for about five percent, the vast majority of errors originate from system management. The interferences from system management at the pipeline/thread/process levels caused by uncertainty and delay are the main reason affecting the reliability of computer systems. The errors of system management originate from operating system. The real-time operating system in PC is an extremely complex system, therein exist a lot of godets resulted from repairing vulnerability. It is difficult to meet the real-time of modern CNC equipment required in aspects of the high-speed/ultra-high-speed, high precision, high reliability, and long-term continuous operation, and in aspects of credibility and security, it is not able to adapt to the requirements of modern manufacturing system in the network and remote manufacturing. Thus, a real-time operating system with high reliability, credibility and security has become a technical bottleneck of existing open CNC systems.

The CANC method of the present invention is not to in real-time generate the increment-type related data flow, and is independent with the real-time of operating system. The data flow controller is no a real-time operating system. Therefore, the CANC avoid reliability, credibility and security that resulted by management errors of the real-time operating system.

9. The Part drawing and the machining process map of the workpiece, and the machine specifications are included all the digital control information needed to manufacture the workpiece. The data control flow file of the present invention is a digital form of the digital control information, as Part drawings, and will enter the market as a commodity. Therefore, the CANC will be expediting a new industry, i.e. digital control information manufacture industry.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 5 is a flowchart of a discrete kinematics planning.

DETAILED DESCRIPTION OF THE PREFERRED EMBODIMENT

Figure 1:
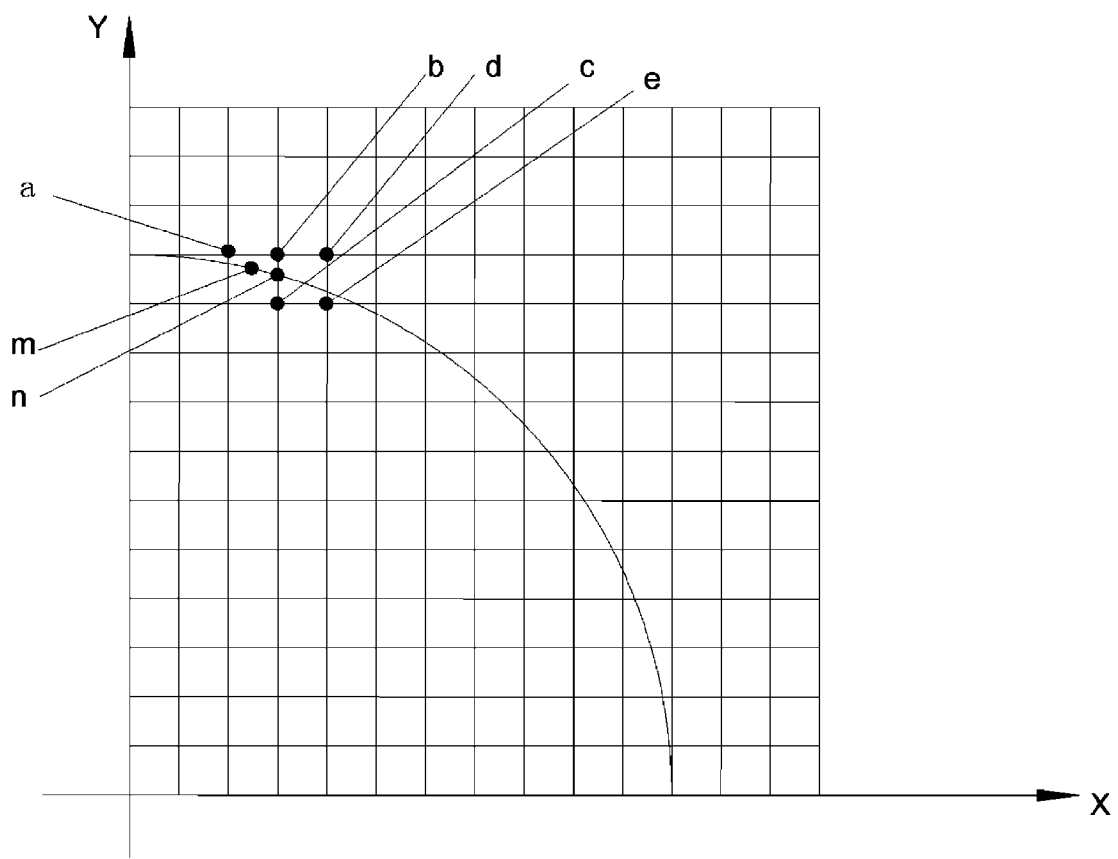
FIG. 1 is a schematic diagram of an orthogonal discrete coordinate system.

The following description is disclosed to enable any person skilled in the art to make and use the present invention. Preferable embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The existing CNC system, the lack of strict definition, is a conventional term. In generally, a CNC system is used to control the motion relationship between axes and the logic relationship between auxiliary devices in a mechanical system. The former is the so-called numerical control, the latter attributed to the PLC. In the above definition, the motion relationship is too general and impossible to reveal the nature of CNC.

In the advanced manufacture field, F is a user parameter, which is the movement speed of the tool center relative to the workpiece along the direction of the tool-path. The workpiece-contour curve planned by a user's program depends on the moving trajectory of the tool center relative to the workpiece, i.e. the tool-path. According to requirements of the machining process, a tool-path generally is consisted of a lot of continuous curves in a planned order.

The workpiece-contour curve is pre-determined, therefore, the motion relationship between axes is a certainty. The core task of a CNC system is to generate digital control information on the axes, which are used to control a given deterministic mechanical movement in the mechanical system via displacements of linear axes and/or angular axes, and to obtain a tool-path. To composite the axis displacements means that the relevant axes must be linkage. Therefore, to obtain a tool-path via the displacements of the relevant axes, in essence, is purely a geometry problem.

There exist errors in any real process. Discretization certainly produces errors. The errors should be further divided into deterministic error and random error.

The displacement errors resulted from discrete errors of a tool-path, machining errors and assembly errors of parts, although are random, but are certainly produced and are within the allowable range. Therefore, these errors can be called deterministic error. The deterministic errors can be ignored or to be compensated via before planning. Some errors, such as thermal deformation errors, although are dependent on many nonlinear factors such as the environmental temperature, the mechanical structure and its materials, however, for the given machine and the certain range of environmental temperature, the distribution of the thermal deformation errors in different temperature intervals is expected in a certain error range. This error is also regarded as a deterministic error or is called a quasi-deterministic error.

For motion control, the changes of dynamic performance of the motion control system and the mechanical system certainly result following errors which are impossible to remain within a certain error range. This error is called the random error. The random error is dynamic corrected by using servo control with a closed-loop or a semi-closed loop.

Therefore, the present invention defines the numerical control as follows: for a workpiece-contour curve and its errors given by a user, the numerical control is to control displacements of the relevant axes and their compositive displacements according to the linkageness, and to control following speeds between these compositive displacements according to the followness, furthermore to realize the deterministic motion relationship of a mechanical system within a given range of the deterministic errors.

The nature of the modern computer is two. The first is to do the simplest thing with the fastest speed. Undoubtedly, the binary arithmetic and logic operations are the simplest operation. The second is the stored program control. Beforehand to give the simplest rules, "prior to store and after to use", i.e. steps to implement a task to be done by a computer (or speak, operation rules and relevant data) were beforehand stored, and the steps are going to execute while need. The stored program control is extended into each level of each subsystem for modern computer system, which is no longer a simple numerical computer, but is a information process system with powerful information processing capabilities. Not just programs are beforehand stored, various types of information also are beforehand stored in a database by a certain format. The database is one of the three basic software of computer system. During information processing, the pre-stored information in the database first are searched, and then are processed and outputted to external devices. From the control point of view, this method can be called stored information control. Unfortunately, the existing CNC technology, for example, the iterative interpolation control, the model-based thermal compensation, etc., are no the stored information control.

Therefore, the present invention defines the computer numerical control as: for a workpiece-contour curve and its errors given by a user, the computer numerical control is adopting the stored information control method to manufacture a related data flow which is used to control displacements of the relevant axes and their synthetic displacements according to the linkageness, and to control following speeds between these synthetic displacements according to the followness, furthermore to realize the deterministic motion relationship of a mechanical system within a given range of the deterministic errors.

The concept of the existing CNC technology regards the CNC system as a real-time command center to control the work-machine, and led to produce redundant information that are independent of the work-machines, such as the interpolation period, the contour-step, and so on.

The present invention found that the primary factor to hinder the development of the CNC technology is the existing control idea. The idea must be changed and a new idea must be established, which means that the task of the CNC system is to serve for work-machines, and only to manufacture digital control information that can not includes other redundant information.

The motion relationship between the axes in a work-machine is a certainty. It means that movement rules concerning the axes are given beforehand. To manufacture the related data flow is to interpret the movement rules, i.e. to decompress the compressed digital control information in the workpiece-contour curve and the feedrate.

Thus, the present invention further found that, in essence, to manufacture the related data flow is a numerical calculation, i.e. a discrete geometry planning on the workpiece-contour curve and a discrete kinematics planning on F, the both are not real-time.

The present invention divides a CNC process to manufacture the digital control information into three sub-processes: the generating sub-process of digital control information, distributing/sending sub-process of digital control information, and executing sub-process of digital control information. They are called as the control flow.

To arrange corresponding equipments according to the machining process, to produce by standard, that is the only way of the manufacture industry. Clearly, the machining process is the basis of the division and cooperation, and professional standardized production. If the digital control information is regarded as a product, then there exists a machining process to manufacture the digital control information. As to arrange the corresponding equipments in the mechanical industry according to the machining process, it is necessary to arrange the corresponding embedded sub-systems according to the control flow to manufacture the digital control information in information manufacture industry.

The present invention thinks that in the IEEE definition three principle errors exist. They are the root cause to use the iterative interpolation control method and produce the five serious deviations and the four endogenous basic defects in the existing CNC system.

The present invention thinks, in the existing CNC system, the root cause used the iterative interpolation control method and produced the five serious deviations and the four endogenous basic defects is that: the IEEE definition exists three principle errors.

The first principle error of the IEEE definition is that: in means of the control concept, the IEEE definition positioned the digital control system as a real-time command center to control a work-machine, there is no the concept on related data flow.

The second principle error of the IEEE definition is that: in means of the architecture, the IEEE definition neglected the nature of the CNC, there is no the control flow, and the CNC system is defined as a special-purpose computer system needed to arrange a real-time operating system.

The third principle error of the IEEE definition is that: in means of the control method, the IEEE definition neglected the essence of the CNC, and neglected that the iterative interpolation control algorithm is only a decompressed method for the digital control information, regarded the management mechanisms for internal/external resources and the adjustment mechanism for internal/external environment changes in the real-time operating system as a universal control mechanism, further discarded the stored information control method, tightly coupled together the operation rules in iterative interpolation algorithms and the task scheduling rules in real-time operating systems to form a real-time control method.

Therefore, the IEEE definition certainly led to the following questions:

1). The any thing is a process. It must be to traverse generating, developing, demising, and to evolve some hierarchical structure. A hierarchical structure in a special hierarchy becomes an object. Any object implements its functions only in a process.

The object is only an artificial abstraction on the structure of the thing in a particular hierarchy, and the process is the dynamic behavior of the actual movement of the thing in the different hierarchy. The process is essential characteristics more than the object. For CNC system, CNC is a process, not an object.

The IEEE definition totally ignored the essence of CNC, and regarded CNC process as an object, hence led to the iteration of the digital control information and the iteration of the control flow. It is impossible to resolve the openness of the digital control information, the openness of the control process, and the openness of the interfaces between the control sub-processes.

2). The operating system handles multi-tasks for multi-users by time-sharing. However, a real-time task in the CNC process is a real-time continuous process.

The openness of the process is completely different with the openness of the object. The openness of the process necessarily involves the control flow of generating, distributing/sending, and executing the digital control information. The IEEE definition is no the concept of the control flow.

3). The open architecture defined by the IEEE is that it did not to arrange the control resources without according to the control flow.

4). The IEEE definition does not regarded the digital control information as a product, and not considered the openness of the digital control information.

5). The IEEE definition centered the CNC system, the defined openness is itself openness of the computer system, the so-called open architecture is transplanted from the computer system and is oriented CNC application software, it is impossible to reflect the technical characteristics of the CNC system in the overall control process.

6). The IEEE definition failed to macro-perspective of the manufacturing system to examine the architecture of the open CNC system, connotation of the openness is ambiguous and has not yet unified. The descriptive terms, such as portability, extensibility, interoperability, and scalability etc. are the so-called technical specifications of the openness, and further hindered the standardization of the CNC system.

7). The IEEE definition ignored the essence of CNC, the CNC system is computerized, the development of the CNC systems is led to iterative interpolation control algorithms and the real-time of control modules.

8). In the IEEE definition, real-time motion control functions provided by the motion control modules are not open to users, the IEEE definition only requires that the motion control modules have the interchangeability and scalability, there is no the reconfigureability.

9). The IEEE definition is limited to the functional division of the CNC application software and the interfaces therebetween, the process characteristics of CNC is not defined from category of systematics. Therefore, in essence, the CNC system is defined as a special-purpose computer system, the open CNC system is defined as a rigid integrated manufacture system used to manufacture digital control information.

10). The IEEE definition produced a lot of redundant information, such as the interpolation period, contour-step etc., this violated the simplicity principle. The redundant information consumed a lot of the computational resources, this violated the economy principle.

Therefore, the IEEE definition is not a definition on the openness of the CNC system, which did not solve the openness of the CNC system, its goal is just to regulate "plug and play" of the application software, vice versa, it forced the CNC system as a special-purpose computer system in the architecture, and firmly nailed the development of the existing CNC systems in "the interpolation era".

The present invention found that the existing CNC systems defined by the IEEE violated the nature of CNC, therefore the existing CNC systems produced the following questions in many terms of control concept, control structure, control mode, control method, control purpose, and architecture:

(1) Control Concept

The IEEE definition centered the existing CNC systems, without the control flow, and is not regarded the digital control information as a product.

(2) Control Structure

The IEEE definition computerized the existing CNC systems, therefore the existing CNC system became a large and complex interrupt system.

(3) Control Mode

Under the auspices of the IEEE definition, the existing CNC systems are centralized control mode under the unified command of the interpolation cycle of real-time operating system. In this control mode, the real-time operating system command all, plan, design, and construction are at the same time.

(4) Control Method

The IEEE definition ignored that the iterative interpolation control algorithm is just a decompression method of the digital control information, therefore the iterative interpolation control method is forced a universal control method.

(5) Control Purpose

Under the auspices of the IEEE definition, interpolation-speed and interpolation-precision of the iterative interpolation algorithm are the basic control purposes of the existing CNC systems.

(6) Architecture

In the existing CNC systems defined by the IEEE, the real-time iteration of I&P configures the existing CNC systems as a hard real-time, high rigidity, and close integrated systems to manufacture digital control information.

The present invention found that the architecture of the existing CNC systems defined by the IEEE is similar to the architecture in the geocentric theory of Ptolemaies, and the both are due to the error from the thought idea.

In the existing CNC systems defined by the IEEE, the manufactured digital control information, the method to manufacture digital control information, as well as the manufacturing process 0f digital control information and interfaces therebetween, are close, non-standard, and non-reconfigured. The manufactured digital control information is internal within the existing CNC system. The openness and reconfigureability of the CNC systems fundamentally are negated, the existing CNC systems and technology are artificially more complicated, insurmountable obstacles are set for the standardization of the CNC systems. Therefore, it is necessary that embedded subsystems in the existing CNC system cannot evolve into standardized functional units, and further the existing open CNC system cannot evolve into a control-machine expected in the third industrial revolution.

The present invention abandoned the IEEE definition, the openness of a CNC system is defined as:

"The so-called open CNC system is a computer numerical control system, wherein its embedded subsystems are configured in accordance with the control flow, which has open man-machine interfaces, open digital control information, open method to manufacture digital control information, open control process to manufacture digital control information and open interfaces between control sub-processes, and open software application."

This definition also applies to the embedded subsystems, and is a definition in the sense of systematics and fractal geometry. In the defined open CNC system, there exist no the iteration of the digital control information and the iteration of the control flow, the topology structure of the control flow is a linear, the openness of the application software is "plug and play".

The IEEE definition involves only the openness of the software application and the openness of man-machine interface using a computer.

The above definition shown that the openness of the open CNC system has six connotations follow as:

1) The openness of the human-machine interface, including all man-machine interfaces during the process to manufacture digital control information;

2) The openness of the digital control information;

3) The openness of the method to manufacture digital control information;

4) The openness of the process to manufacture digital control information;

5) The openness of the interfaces between the control sub-processes;

6) The openness of the software application, i.e. "plug and play".

In accordance with the above definition of open CNC system, the DRC comprehensively changed to the existing CNC system in aspects of control concept, control structures, control mode, control method, control purpose, and architecture:

(1) Control Concept

The DRC is centered work-machine, therefore CNC system services for work-machine, and is used to manufacture digital control information only required for the work-machine.

(2) Control Structure

The DRC abandons the computerization of the existing CNC systems, and regards the digital control information as a product. Therefore, the DRC is necessary to arrange the control resources only according to the control flow. The computer system is no longer a real-time control center to manufacture digital control information, but a non-real-time planning center.

(3) Control Mode

The DRC abandons the centralized control mode of the existing CNC systems, in accordance with the principle of "from each according to his ability", and uses the distributed control mode of "first planning, and executing after optimization" for generating, distributing/sending, and executing of the digital control information.

(4) Control Method

The DRC abandons the iterative interpolation control method, and uses the storage control method based on the data flow related control.

(5) Control Purposes

The DRC regards no longer the interpolation precision and the interpolation speed of iterative interpolation control algorithms as the aim, but the optimal state of the related data flow as the aim.

(6) Architecture

The DRC eliminated the iteration of digital control information and iteration of the control flow, therefore abandons the hard real-time, high rigid and closed architecture in the existing open CNC system, presents a weak real-time, flexible and all-open architecture.

Therefore, the above definition reflects the standardization issue for control-machine, and adapts the standardization course of work-machine and power-machine required from the development of modern manufacture environments.

The present invention regarded the digital control information as a product. Therefore, the control flow is divided into the three sub-processes, including the generating sub-process, distributing/sending sub-process, and executing sub-process of the digital control information.

So, the concept is changed, the present invention found that the manufacturing process of digital control information, which includes the decompressing sub-process, optimizating sub-process, as well as the deterministic error compensating sub-process etc., are a non-real-time planning process. The distributing/sending sub-process as military orders cannot be disobeyed, and the executing sub-process with astonishing speed, the both must be real-time.

In accordance with the control flow to manufacture digital control information, the architecture of the DRC-based control-machine is decoupled three functional units such as a generating unit of the digital control information, a distributing/sending unit, and an executing unit. This control method and architecture is open, weak real-time, flexible and all open in terms of the digital control information, computer numerical control method, computer numerical control process, and architecture etc., therefore fundamentally solved the openness, reconfigurebility and standardization of CNC systems.

The above definitions on the numerical control and computer numerical control show that the digital control information needed by the work machine is only the related data flow. Therefore, the basic problem of CNC technology and CNC system is that, for a workpiece-contour curve, process parameters and relevant uncertainty errors given by a user, what technology is used to manufacture the related data flow, in particular, the increment-type related data flow.

The present invention discloses a computer-aided numerical control method (CANC), which is used to manufacture the increment-type relater data flow and a relater data flow file for a tool-path.

The present invention is based on the discrete geometry and the discrete kinematics established by the inventor.

The discrete geometry researches on geometric invariants of a tool-path, therein the tool-path is discreted and its extended direction is constrained, reveals the intrinsic link between the relater data flow and the microscopic structure of the tool-path. The discrete kinematics researches on motion laws in non-Euclidean space, therein feed directions are constrained and displacements are discreted, reveals the intrinsic link between the trajectory of the tool center and the structure of the relater data flow.

The discrete geometry and the discrete kinematics laid the theoretical foundation for the generating and the optimization of the related data flow, and also laid the foundation the technical solution for the computer-aided numerical control method of the present invention.

Without loss of generality, as an example, the present invention establishes some basic concepts on the discrete geometry and the discrete kinematics for a two-dimensional motion.

(1) Discrete Coordinate System

Digitalization is to replace the continuous quantity with the discrete quantity. It is certainly produces errors. A tool-path is discreted by a given precision in CNC system. The allowed discrete error is also known as a discrete scale, denoted by e.

Due to many factors, such as machining errors and assembly errors of parts, backlashes and frictions between the transmission chains, residual stress, rigidity of mechanical system and so on, mechanical displacement of axis has a minimum resolution, commonly known as feed equivalent, denoted by $e_f$. Mechanical displacements less than $e_f$ are meaningless for axes.

In general, the discrete scale is equal to the feed equivalent. In the fine machining, the discrete scale is less than the feed equivalent. The discrete scale of each axis may be different, for example, the discrete scale of the x-axis is $e_x$, the discrete scale of the y-axis is $e_y$.

The axes are discreted by a discrete scale, the coordinate planes are grided by a set of equidistance line, therein the distance between lines is equal the discrete scale. Thereby the coordinate system is called discrete coordinate system. Discrete scales $e_x, \ldots, e_y$ are the system parameters of the discrete coordinate system.

As shown in the FIG. 1, a discrete coordinate system is called orthogonal discrete coordinate system, if the feed directions of the axes are mutual perpendicular, for example, Cartesian coordinate system, polar coordinate system; a discrete coordinate system is called non-orthogonal discrete coordinate system, if the feed directions of the axes are mutual non-vertical.

The non-verticality and the non-parallelism between the axes, backlashes and pitch errors of the axes are the inherent characteristics of the mechanical system, are also the system parameters of the discrete coordinate system.

(2) Lattice Point

In the orthogonal discrete ordinates system, an intersection of the equidistant lines is called the lattice point, such as points a, b, c in the FIG. 1.

Only the lattice points are the locations allowed by discrete movement of the axes.

(3) Permissible Feed Direction, Repelling Feed Direction and Priority Feed Direction In CNC system, the axis feed directions are cons trained. For example, for a x/y coordinates table, the feed directions are +x, −x, +y, −y, and four composited feed directions +x/+y, +x/−y, −x/+y, −x/+−y (where +x/+y denotes the compositive feed direction composited by +x and +y), which are used to linkage the x-axis and the y-axis. The eight feed directions are called the permissible feed direction of the mechanical system.

In CNC system, the cutting process is a movement relative the tool to the workpiece, and the extension of the tool-path has a specific direction. The direction is called the orientation of the tool-path.

For example, for a counterclockwise arc in the first quadrant, its orientation is northwest.

When the orientation of a tool-path is northwest, only −x, +y, and −x/+y are the permissible feed direction of the tool-path, other directions are the repelling feed direction of the tool-path.

Further, the feed directions are constrained by the slope of the tangent at a point of the arc. For example, if the slope of the tangent of the point is greater than 1, −x is deviated from the arc, and thus −x is the repelling feed direction, or said, −x is implicated by −x/+y, the permissible feed direction is +y and −x/+y. If the slope of the tangent at the point is less than 1, +y is deviated from the arc, thus +y is the repelling feed direction, or said, +y is implicated by −x/+y, the permissible feed direction is −x and −x/+y.

If the tangent of a point is near parallel with the x-axis, then −x is the priority feed direction; if the tangent of a point is near parallel with the y-axis, then +y is the priority feed direction; if the tangent of a point is near parallel with the 45° line, −x/+y is the priority feed direction.

(4) Image Set of a Tool-Path

A point at the tool-path is called a preimage, such as points n and m in the FIG. 1.

If the distance between a lattice point and an preimage is less than or equal to the discrete scale, then the lattice point, as a digital image of the preimage, is called an image of the tool-path, such as points a, b, c, d, e in the FIG. 1.

All images of the tool-path form a collection, which is called the image set of the tool-path. For example, for the circle of radius r, all lattice points, which are at the two circles of radius (r−e), (r+e) and within the ring between the two circles, is the image set of the tool-path, where e is a discrete scale.

In a given discrete coordinate system, the image set of the tool-path and its distribution in the discrete coordinate system depend entirely on geometry structure of the tool-path.

Obviously, a preimage of the tool-path has multiple images; conversely, an image of the tool-path corresponds with multiple preimages.

For a given image, a set of all images at the allowing feed directions is called a neighborhood of the image. For the image b in the FIG. 1, if the tool-path is counterclockwise, its neighborhood is the point a; if the tool-path is clockwise, its neighborhood is the points d and e, the point c is located at the repelling feed direction, and is not a neighborhood of the image b.

For a given tool-path, all neighborhoods form a set, which is called the neighborhood set of the tool-path. The neighborhood set is a subset of the image set of the tool-path at the allowing feed directions.

(5) Related Data Flow

Digitalization is just discretization. A tool-path is discreted a sequence of images by a discrete scale, and axis increments therebetween are a discrete scale, i.e. equal to "1" or "0". The sequence is called a microscopic digital image of the tool-path, or said, the sequence is a step-type related data flow of the tool-path.

The microscopic digital image of a tool-path describes a fine microstructure of the tool-path.

If axis increments are not a discrete scale, but several discrete scales, the sequence is called an increment-type digital image, or said, the sequence is an increment-type related data flow of the tool-path.

For a multi-axes mechanical system, the related data flow is multi-dimensional.

(6) Drive-Axis and Linkage-Axis

Obviously, for a straight line with the slope of +1 or −1, its step-type related data flow is all "1".

In step-type related data flow of other straight lines, it is certainly all "1" for one axis, i.e. "1" is continuous (i.e. the coordinate value is larger), the axis is called the drive-axis; it is certainly not all "1" for another axis, i.e. "1" is not continuous (i.e. the coordinate value is smaller), the axis is called the linkage-axis. This means that the drive-axis data flow can be regarded as an independent discrete variable, and the linkage-axis data flow is a distribution of the drive-axis data flow.

Two oblique lines of 45° and 135° over the coordinate origin divide the four quadrants into eight intervals. Their intersections with a tool-path are called the feature points of the tool-path. At each feature point, the tool-path from one interval into another interval, and the x-axis and y-axis change their attribute on the drive/linkage.

(7) L-Division

For a segment curve at a tool-path, some of micro line-segment $\Delta L_i$ (briefly, denoted by micro-segment) are used to approximate the curve, their normal distance from the curve is less than or equal to the discrete error, and the end-point of $\Delta L_i$ is the start-point of $\Delta L_{i+1}$. The sum of all micro-segments is called the L-division of the curve, denoted by $L_1, \ldots, \Delta L_n$.

The axis and points at the axis are distinguished by a subscript, for example, $\Delta L_{i,x}$ and $\Delta L_{i,y}$ are x-component and y-component of the $\Delta L_i$. For $\Delta L_{i,x}$, the subscript "i" denotes the start-point $x_i$ of the micro-segment, the second subscript "x" denotes the x-component of the $\Delta L_i$.

For any i, the error between the $\Delta L_i$ and the correspondent curve-segment is not more than a discrete scale.

The L-division of the tool-path corresponds to an increment-type related data flow. In other words, the L-division of the tool-path is an increment-type digital image of the tool-path.

(8) Structure Factor

Let $L_1, \ldots, \Delta L_n$ are micro-segments in the L-division of a tool-path, and where is no the feature point in the tool-path, $\Delta L_{i,x}$, $\Delta L_{i,y}$ are x-component and y-component of the micro-segment $\Delta L_i$.

Then let the x-axis is a drive-axis, obviously, the x-axis is always a drive-axis for all $\Delta L_i$. The data flow of the linkage-axis (y) is a distribution on the data flow of the drive-axis (x). Therefore, the discrete geometry structure of the tool-path depends only on components $\Delta L_{i,y}$ of the linkage-axis (y).

The curvature of the tool-path at the point $(x_i, y_i)$ lead that the length of the micro-segment $\Delta L_i$ exists a maximum value. The maximum value is called the intrinsic length of $\Delta L_i$ at the point $(x_i, y_i)$. If the length of $\Delta L_i$ is an intrinsic length, the component $\Delta L_{i,y}$ of the linkage-axis (y) is called discrete geometry structure factor (briefly, structure factor) at the point $(x_i, y_i)$, denoted by $G_{i,y}$, and the end-point of $\Delta L_i$ is called intrinsic image.

For all i, if the length of the micro-segment $\Delta L_i$ is a intrinsic length, i.e. the linkage-axis component of the micro-segment $\Delta L_i$ is the structure factor of the start-point $(x_i, y_i)$, then the L-division is called intrinsic L-division of the tool-path, denoted as $\Delta L_i$ (i=1, . . . , n).

(9) T-Division

The time T is discreted a number of intervals of unequal length: $\Delta t_1, \ldots \Delta t_i, \ldots, \Delta t_m$. The sum of $\Delta t_i$ is called a discrete division of the time T, a T-division for short, denoted by $\Delta t_i$ (i=1, . . . , m), where m=n−1, n is number of the micro-segments.

(10) Linkageness and Linkage-Table of the Related Data Flow

A group of increments at point $t_i$ of a step-type related data flow, as a group of "0" and "1", is called a state of the step-type related data flow at the point $t_i$; similarly, a group of increments of an increment-type related data flow in interval $\Delta t_i$ called a state of the increment-type related data flow in the interval $\Delta t_i$.

Clearly, the related data flow is a state flow on discrete position information of a tool-path. In the state flow, there exists not only the discrete position information, but the associated information therebetween.

The associated information describes linkageness between the discrete position information.

The so-called linkageness of the related data flow shows the simultaneity on the movements of the relevant axes in interval $\Delta t_i$ (or at point $t_i$), i.e. the simultaneity of $\Delta Li$ in the L-division.

The linkageness of the related data flow determines the displacements of the relevant axes in interval $\Delta t_i$ (or at point $t_i$) and to implement the compositive displacement. It reflects tool-path's geometry feature, and is CNC's essential attribute.

For a given tool-path, the discrete position information and linkageness therebetween, as tool-path's geometry attribute, are independent of the method and process to control the relevant axes and implement the tool-path.

The linkage-table to used to describe the L-division is created in a storage space by a given data format. Through the linkage-table, the displacements required to control linkage of the relevant axes in interval $\Delta t_i$ (or at point $t_i$) are transformed space correlation of the related data flow in the storage space.

(11) Followness and Follow-Table of the Related Data Flow

The associated information also includes followness between two adjacent states in the related data flow.

The so-called followness of the related data flow shows the sending speed of the related data flow, i.e. the time interval between two adjacent states, that is the T-division.

The followness of the related data flow decouples geometry feature of the tool-path and time feature of the real time control process, determines following speed between two adjacent compositive displacements, which is the feedrate of the tool and is CNC's nonessential attribute.

The linkage-table to used to describe the T-division is created in a storage space by a given data format. Through the linkage-table, F of the tool is transformed space correlation of the related data flow in the storage space.

(12) Regular Curve

In manufacturing, the tolerance is a basic property of a workpiece-contour curve. The tolerance is equal to the algebraic difference of the absolute value of the allowable maximum size and the allowable minimum size. An area limited by the two straight lines, which represent the allowable maximum size and the allowable minimum size, is called the tolerance zone. In general, half of the tolerance is much larger than the discrete error.

A workpiece-contour curve given by a designer is called as the basic curve, a nominal size given by a designer is called as the basic size.

The upper deviation and lower deviation of the basic size are often not equal. The size corresponding to tolerance center is called as the regular size. The upper deviation and lower deviation of the regular size are equal.

The basic size of a workpiece-contour curve given by a designer is converted to the regular size, the resulting workpiece-contour curve is called regular curve. In a tolerance zone of the regular curve, the upper deviation and lower deviation are equal.

Let e is the discrete error. Two lines in distance ±e to basic curve or regular curve is called boundary line of the basic curve or regular curve.

(13) Time Equivalent of Motion Control System

In the field of advanced control, step-motor and servo-motor are two basic power equipment to realize axis's motion control. For step control, when F exceeded the maximum step frequency, the step-motor is out of step, the maximum step frequency is called time equivalent of the step motion control system, i.e. the allowable minimum time between two step feeds. For servo control meet requirement of dynamics, similar to step control and the maximum step frequency, when F exceeded the minimum sampling period, the servo-motor is out of part increment, and thus the minimum sampling period is called the time equivalent of the servo motion control system, denoted by $E_t$.

The present invention found that the discrete geometry has the following nine basic characteristics.

1. First Basic Characteristics

For discrete geometry, the axis feed directions is constrained, for example, the x-axis and the y-axis feed only a discrete displacement in the forward or reverse. Due to the feed direction is constrained, the space lost isotropic in the discrete geometry, therefore the space is no longer the Euclidean. The discrete geometry structure of a tool-path is inconsistent with its Euclidean geometry structure.

This is the first basic characteristics of discrete geometry.

2. Second Basic Characteristics

Due to the x/y coordinate table has 8 permissible feed directions, therefore the uniqueness of the microscopic digital image of a tool-path is destroyed.

This is the second basic characteristic of discrete geometry.

3. Third Basic Characteristics

In the microscopic digital image of a straight line, the linkage-axis data flow is a periodical distribution on the drive-axis data flow. For the linkage-axis data flow, a number of "1" in a period depends only on the slope of the straight line. Therefore the periodicity of the linkage-axis data flow is a geometric invariant of discrete geometry.

This is the third basic characteristic of discrete geometry.

4. Fourth Basic Characteristics

A tool-path can be discreted a number of discrete points, which constitute a microscopic digital image of the tool-path; a tool-path can also be discreted some micro-segments, which constitute the increment-type digital image of the tool-path. The discrete points are geometric elements for the former, the micro-segments are discrete geometric elements for the latter.

A tool-path has only two types of digital images: microscopic digital images and increment-type digital image. This is the fourth basic characteristics of discrete geometry.

5. Fifth Basic Characteristics

Due to the directionality of the space, the discrete error depends on the feed direction. Therefore the symmetry of the digital image of a tool-path is destroyed, it is necessary to produce a symmetry breaking.

This is the fifth basic characteristics of discrete geometry.

6. Sixth Basic Characteristics

Due to the directionality of the space, in the discrete coordinate system, the x-axis data flow is asymmetry with the y-axis data flow, each axis is divided the drive-axis or the linkage-axis.

The axes have drive/linkage property. This is the sixth basic characteristics of discrete geometry.

7. Seventh Basic Characteristics

It is well known that the geometry of each point at an arc is the same in Euclidean space due to the isotropy of the space, the L-division of the arc is independent of the point $(x_i, y_i)$. However, in discrete geometry, the L-division of the arc is dependent of the point $(x_i, y_i)$ due to the directionality of the space, its L-division is different for each point $(x_i, y_i)$ at the arc.

Therefore, for any tool-path, the structure factor $G_{i,y}$ of the linkage-axis (y) at the point $(x_i, y_i)$ and the intrinsic L-division describe the discrete geometric properties of the tool-path.

This is the seventh basic characteristics of discrete geometry.

8. Eighth Basic Characteristics

In the L-division $\Delta L_i$ (i=1, ..., n) of a tool-path, for any i, $\Delta L_i$ is the intrinsic length, the component $\Delta L_{i,y}$ of the linkage-axis (y) is equal to the structure factor $G_{i,y}$ at the point $(x_i, y_i)$. Obviously, for any i, the length of $\Delta L_{i,y}$ can only be less than or equal to $G_{i,y}$. Therefore, the intrinsic L-division $\Delta L_i$ (i=1, . . . , n) is the upper bound of all L-divisions of the tool-path.

This is the eighth of the basic characteristics of discrete geometry.

9. Ninth Basic Characteristics

In discrete geometry, any tool-path has only microscopic digital image and increment-type digital image, their discrete position information corresponds to discrete points and micro-segments. The tool-path can be composed only according to discrete position information. Therefore, the tool-path is just a result to composed discrete position information on the relevant axes.

Simply, assume that the mechanical system is the x/y coordinate table, the x-axis, y-axis can only forward/reverse feed. The tool-path is implemented, if and only if the displacements of the relevant axes are changed, and vice versa.

Therefore, the change of displacement of the relevant axes is necessary and sufficient conditions to realize the tool-path.

This is the ninth feature of discrete geometry.

Discrete kinematics based on discrete geometry, the present invention found that the discrete kinematics has the following seven basic characteristics.

1. First Basic Characteristics

For discrete kinematics, the axis feed directions is constrained, for example, the x-axis and the y-axis feeds only a discrete displacement in the forward or reverse. Due to the feed direction is constrained, the space lost isotropic. Therefore the space is no longer the Euclidean, a tool-path is no longer a Euclidean curve in the discrete kinematics.

This is the first basic characteristics of discrete kinematics.

2. Second Basic Characteristics

In the discrete coordinate system, the directionality of the space led to the x-axis and y-axis are asymmetry, the axis is divided the drive-axis or the linkage-axis.

Due to the axes are asymmetric, and have drive/linkage property. This is the second basic characteristic of discrete kinematics.

3. Third Basic Characteristics

Through advance planning, the deterministic motion relationship between axes is controlled within the range of deterministic errors, this is the nature of digital control.

The geometry of the workpiece contour curve and the tool are pre-determined, therefore, the motion relationship between axes is a certainty. The core task of CNC system is to generate digital control information on the axes, which are used to control a machine to implement a given deterministic mechanical motion via linear axis displacements and/or angular axis displacements, and to composite a tool-path. On the one hand, to composite a displacement requires that the relevant axes must be linkaged, on the other hand, requires that the composite displacements are implemented by an optimal feedrate. To composite a displacement and to continuously implement the compositive displacements are two different problems in nature. To composite a displacement depends only on the states of the related data flow, which involve in the space structure of the tool-path; to continuously implement the compositive displacements depends on the time interval between the adjacent states in the related data flow, which involve process parameters. Therefore, the space structure and time structure of the related data flow, in essence, are not coupled.

This is the third basic feature of discrete kinematics.

4. Fourth Basic Characteristics

In the discrete kinematics, the time is an independent free variable. This is the fourth basic characteristics of discrete kinematics.

5. Fifth Basic Characteristics

Two oblique lines of 45° and 135° over the coordinate origin divide the four quadrants into eight intervals. Their intersections with a tool-path are called the feature points of the tool-path. At each feature point, the tool-path from one interval into another interval, and the x-axis and y-axis change the drive/linkage property.

To follow the feature points of the tool-path, the x-axis and y-axis alternate change the drive/linkage property. This is the fifth basic characteristics of discrete kinematics.

6. Sixth Basic Characteristics

In Newtonian kinematics, the displacement and velocity of a curvilinear motion can be decomposed displacement components and velocity components of the relevant axes in accordance with parallelogram rule, and vice versa.

In discrete kinematics, a curvilinear motion is implemented in accordance with the displacements of the relevant axes. The change of the displacements of the relevant axes is necessary and sufficient conditions to the curvilinear motion. A compositive F generated by the components of F does not obey the parallelogram rule. In discrete kinematics, the parallelogram law of F fails.

This is the sixth basic characteristics of discrete kinematics.

7. Seventh Basic Characteristics

Let a tool-path is a continuous curve, the L-division of the tool-path is $L_1, \ldots, \Delta L_m$, the T-division is $\Delta t_i$ (i=1, . . . , m), where m=n−1, n is the number of micro-segments. During $\Delta t_i$, x-axis and y-axis linkage, i.e. the x-axis and y-axis produced the displacement $\Delta L_{i,x}$, $\Delta L_{i,y}$, and implemented the compositive displacement $\Delta L_i$. The magnitude and direction of $\Delta L_i$ are changed at each $\Delta t_i$. It is the intrinsic property of the tool-path.

$F_{i,x} = \Delta L_{i,x}/\Delta t_i$, $F_{i,y} = \Delta L_{i,y}/\Delta t_i$, therefore, for the T-division $\Delta t_i$ (i=1, . . . m), F is necessary to produce a jump, in other words, F is not continuous.

This is the seventh basic characteristics of discrete kinematics.

The above basic characteristics of discrete geometry and discrete kinematics laid the foundation of CANC.

The present invention think that the core task of CANC is to decompress digital control information compressed in a tool-path and F, and to manufacture digital control information of the tool-path, i.e. to plan the L-division and T-division of the tool-path.

The L-division, which includes displacement information on the relevant axes and the linkageness therebetween, is used to control the relevant axes to implement required compositive displacements. The T-division, which includes feedrate information and the followness therebetween to continuously implement the compositive displacements according to required the motion smoothness, is used to control the time interval between the two adjacent compositive displacements.

The present invention also think that a tool-path is no longer an Euclidean curve, the L-division of the tool-path must consider the structure factor $G_{i,y}$ of the linkage-axis at the point $(x_i, y_i)$, and to eliminate non-Euclidean errors.

The L-division relates to the discrete geometry structure of a tool-path, it is a discrete geometry programming problem. The T-division relates to the jump of F, it is a discrete kinematics planning problem.

The digital image of the L-division generated in a storage space by a given data format is called the linkage-table of the tool-path. The digital image of the T-division generated in a storage space by a given data format is called the follow-table of the tool-path.

The digital image of the linkage-table and the follow-table linked in a storage space by a given data format is called the related data flow file.

Therefore, the core task of CANC is to plan the related data flow, and to manufacture the related data flow file by a given data format.

The present invention is more specifically described in the following paragraphs by reference to the drawing and a preferred embodiment.

Figure 2:
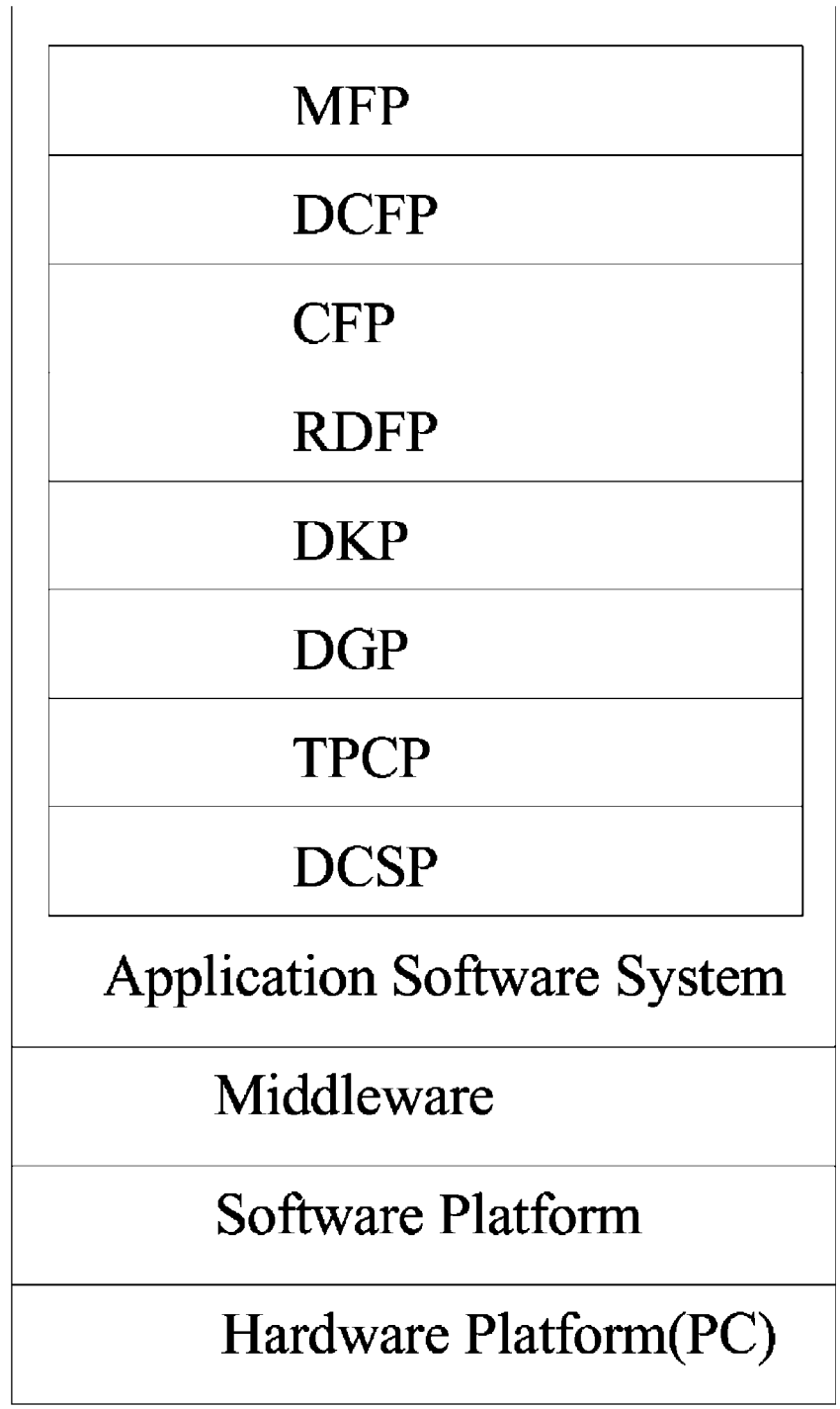
FIG. 2 is a schematic architecture diagram of a computer-aided numerical control system.

A computer-aided numerical control system based on PC, as shown in FIG. 2, is comprised a hardware platform, a software platform and an application software.

The hardware platform is PC, the software platform is GUI operating system, and is also comprised a 3D graphics library, such as the OpenGL. OpenGL is a 3D graphics library independent of the operating system and hardware environment, has a powerful graphics capabilities and a good cross-platform portability, and has become the de facto graphics standard. OpenGL is widely used in many fields of computer simulation, visualization, solid modeling, CAD/CAM/CAE.

The application software is comprised: a discrete coordinate system planning module (DCSP); a tool-path planning module (TP); a discrete geometry planning module (DGP); a discrete kinematics planning module (DKP); a related data flow file planning module (RDFP); a control flow file planning module (CFFP); a data control flow file planning module (DCFP); and a miscellaneous function planning module (MFP).

The application software are based on API (application programming interface).

The functions of the application software are as follows:
1. The discrete coordinate system planning module;

The DCSP module is used to establish a discrete coordinate system by gridding coordinate planes by a set of equidistance line, there the distance between the lines is equal a given discrete scale.

2. The tool-path planning module

The TPCP module is used to divide a tool-path into K curves according to feature points of the tool-path, to determine a drive-axis and linkage-axes, and to generate a tool-path file for each curve of the K curves there K is the number of the curves.

3. The discrete geometry planning module

The DGP module is used to generate the intrinsic L-division for each curve in the tool-path file;

4. The discrete kinematics planning module

The DKP module is used to generate the T-division for the intrinsic L-division.

5. The related data flow file planning module

The RDFP module is used to generate a linkage-table file for the intrinsic L-division and a follow-table file for the T-division in a storage space by a given data format, and to link the both as a related data flow file.

The RDFP module sets the window "error compensation". According to the deterministic errors (or quasi deterministic errors) such as the backlashes of axes, pitch errors, and thermal deformation errors, the RDFP module modifies the linkage-table and the follow-table of the related data flow, compensates the deterministic errors, and adjusts the linkage-table and the follow-table.

6. The control flow file planning module

The CFP module is used to plan a control flow to control switch devices, and to generate a control flow file in a storage space according to a data format and the machining process given by a user.

The CFP module can be a conventional PLC.

7. The data control flow file planning module

The DCFP module is used to link the control flow file with the related data flow file, and to generate a data control flow file by a data format and the machining process given by a user.

8. The miscellaneous function planning module

The MFP module is used to operate miscellaneous functions on running states, such as manually and automatically sets, specified program segment, simulation and display 0f the tool-path, sending the data control flow file through an interface.

Figure 3:
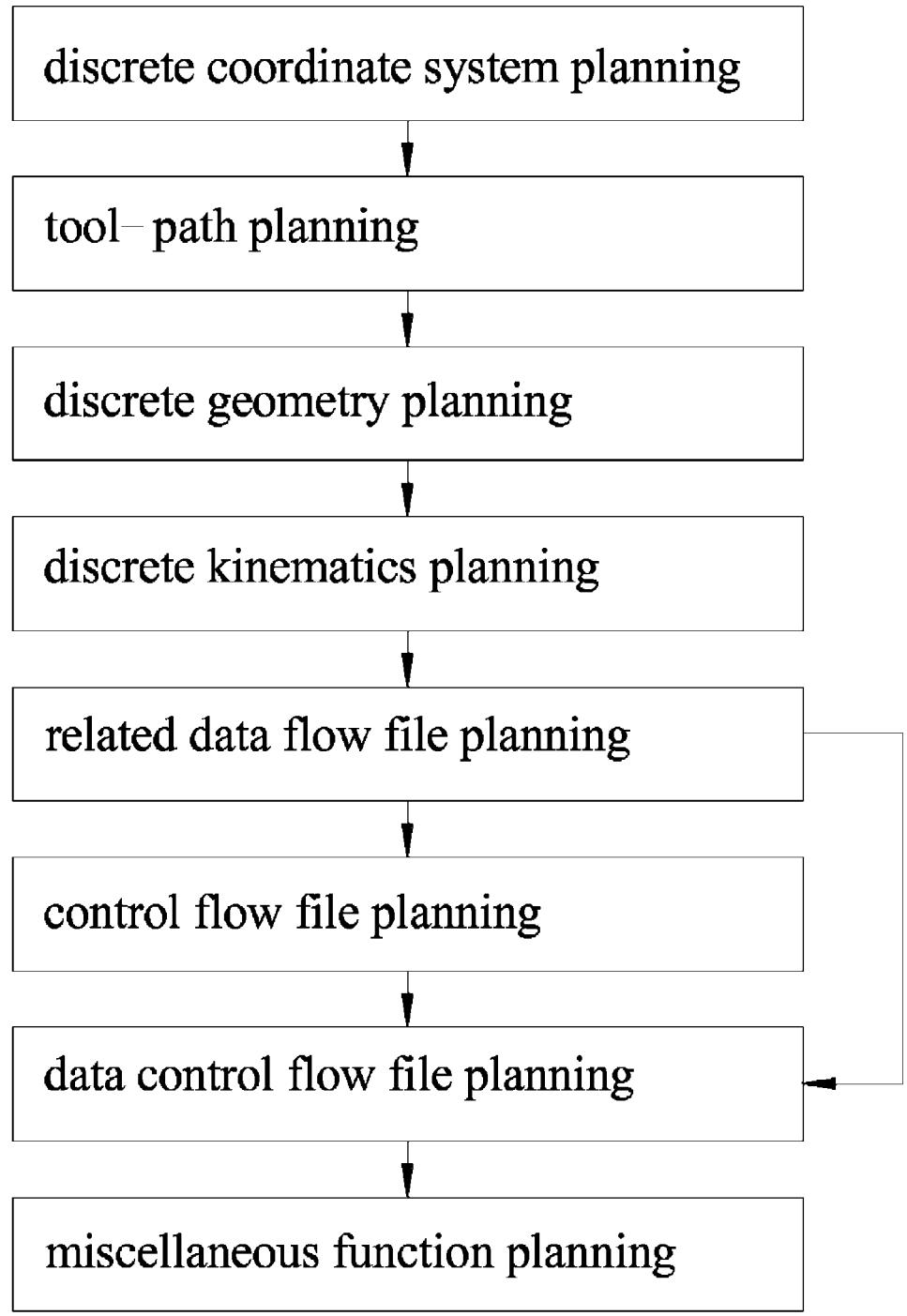
FIG. 3 is a control flowchart of a computer-aided numerical control method.

A computer-aided numerical control method, as shown in FIG. 3, comprising the four steps of: related data flow planning (1); control flow file planning (2); data control flow file planning (3); and miscellaneous function planning (4).

The related data flow planning (1) is used to manufacture digital control information 0f the tool-path, and to generate a related data flow file.

The control flow file planning (2) is used to plan a control flow to control switch devices, and to generate a control flow file in a storage space according to a data format and the machining process given by a user;

The data control flow file planning (3) is used to link the control flow file with the related data flow file, and to generate a data control flow file by a data format and the machining process given by a user;

The miscellaneous function planning (4) is used to operate miscellaneous functions on running statuses, such as manually and automatically sets, specified program segment, simulation and display 0f the tool-path, sending the data control flow file through an interface.

The related data flow planning (1) comprising the five steps of: discrete coordinate system planning (101); tool-path planning (102); discrete geometry planning (103); discrete kinematics planning (104); and related data flow file planning (105).

1. Discrete Coordinate System Planning (101)

The discrete coordinate system planning (101) is used to establish a discrete coordinate system by griding coordinate planes by a set of equidistance line, therein the distance between the lines is equal a given discrete scale.

Popping up the coordinate system page, where is the window "orthogonal/non-orthogonal discrete coordinate system";

Clicking "orthogonal discrete coordinate system", to popup the orthogonal discrete coordinate system as shown in FIG. 1, where is the window "system parameters";

Clicking "system parameters", to popup the pull-down menu "discrete scale", where is set up a discrete scale for each axis.

According to the pull-down menu, the discrete scales in the orthogonal discrete coordinate system are determined, for example, the discrete scale is 0.01 mm, or 1 μm, or 1 nm for a linear axis, the discrete scale is 1°, or 1' for a rotation axis.

2. The Tool-Path Planning (102)

The tool-path planning (102) is used to establish the basic curve of a workpiece-contour curve in the discrete coordinate system, to correct the basic curve, to complete tool compensation according to the machining process, and to generate a tool-path; further to divide the tool-path into K curves according to feature points, and to generate a tool-path file for each curve of the K curves.

Step 1021 is used to generate the basic curve of the workpiece-contour curve in the discrete coordinate system.

A user can choose the basic curve set by the system, such as "straight line", "arc", "NURBS curve", "spiral", "parabola", and "ellipse", or to create the user's own new curve through the window "create a new curve", and establish the basic curve of the workpiece-contour curve according to design requirements.

Setting basic dimensions of the curve, for example, the basic dimensions of a straight line are coordinate values of its end-point; the basic dimensions of an arc are coordinate values of its start-point, end-point, and center. According to the prompt, a user can input the basic dimensions, and the upper deviation and lower deviation of the basic dimensions for the curve.

Step 1022 is used to establish a regular curve.

The system can be transformed a basic curve into a regular curve, or a regular curve as a basic curve, and to generate the workpiece-contour curve of basic curve or regular curve mode in the orthogonal discrete coordinate system.

Step 1023 is used to complete tool compensation.

Then, "tool compensation" window is popped up in the orthogonal discrete coordinate system;

In the drop-down list of the "tool compensation" window, "tool radius", "tool length", and "radius of transition arc" are set, which are related to the machining process; a users inputs the appropriate values;

After the inputs, to click "OK", and the tool compensation of the workpiece-contour curve is completed.

Step 1024 is used to plan the cutting path according to the machining process.

According to requirements of the machining process, a user sets information such as the coordinate origin, the end coordinates of fast forward, the coordinates end of quickly return, and determines the serial number of tool-paths. The system sets "coordinate origin", "fast feed path", "cutting path 1", "cutting path 2", . . . , "cutting path n", "fast return path" etc., determines the cutting sequence of the tool-paths and the appropriate feedrate for each tool-path.

Step 1025 is used to divide a tool-path into k curves according to the feature points, to determine the drive-axis and linkage-axes for each curve of the k curves, and to generate a tool-path file.

3. The Discrete Geometry Planning (103)

For each curve in the tool-path file, according to given optimization goals, the discrete geometry planning (103) is used to generate point-by-point the intrinsic L-division.

The tool-path is discreted by different algorithms, then the distributions of the linkage-axis data flow are different, and the L-divisions are also different.

Because of the microscopic digital image of the tool-path is not unique, and according to different optimization goals can be selected different discrete algorithms to generate the intrinsic L-division of the tool-path.

The discrete algorithm of the tool-path depends on the machining process. For example, during rough machining, the machining speed is the most important, therefore, if the movement direction is a priority direction, the total distance is the shortest in the intrinsic L-division. During finish machining, the machining precision is most important, therefore, in the intrinsic L-division, if the discrete error of each image is minimal, then the intrinsic L-division has minimum deviation. The fit between parts greatly influences on the dynamic performance of mechanical system. For each image, if the distribution of its discrete errors in the tolerance zone is consistent with the fit, then the intrinsic L-division is optimal for the fit.

Figure 4:
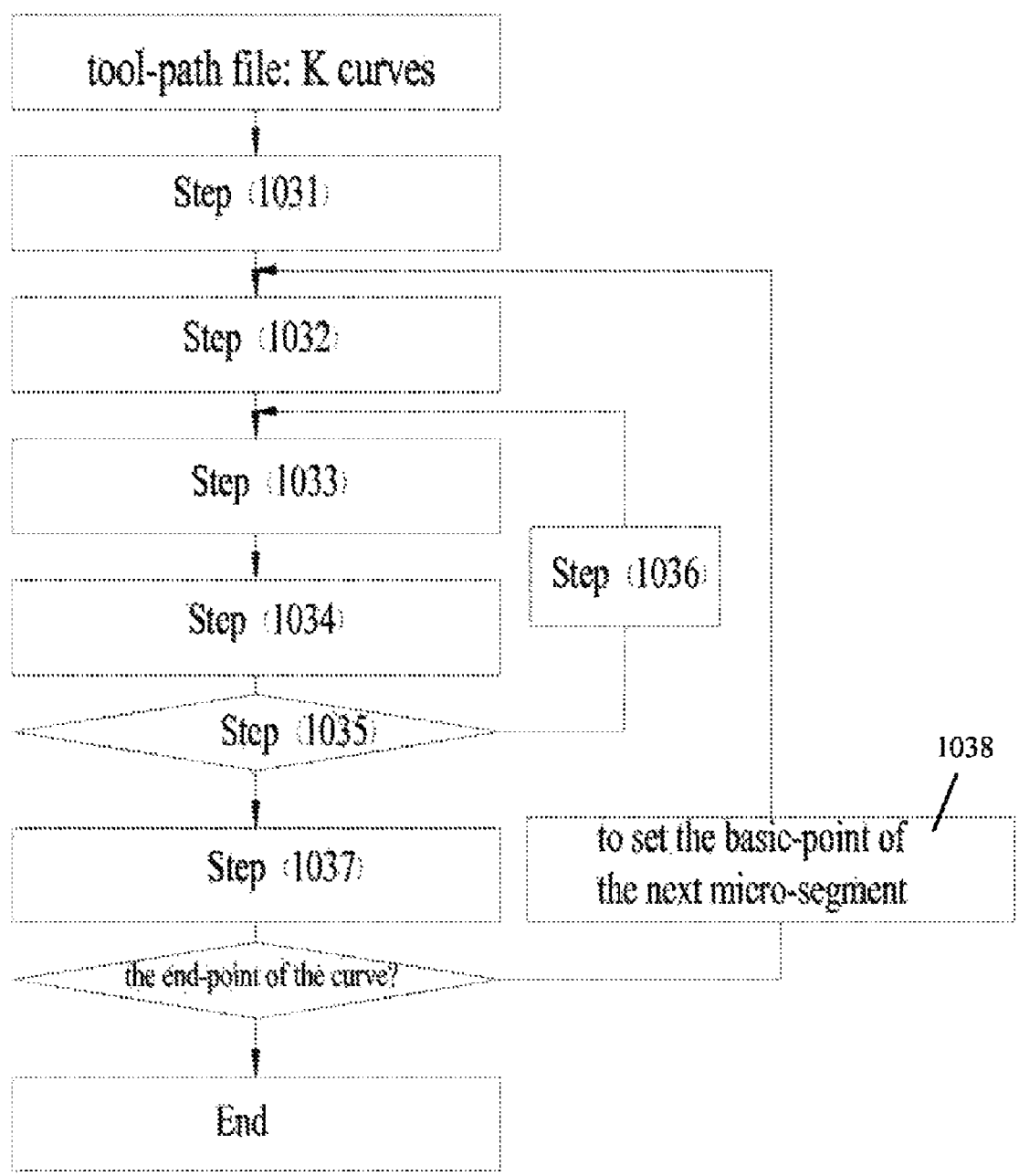
FIG. 4 is a flowchart of a discrete geometry planning.

The FIG. 4 is a flowchart of a discrete geometry planning

The optimization goals include the shortest distance, the minimum discrete error, the optimization of tolerance and fit.

After determining an optimal goal for a curve of the K curves, the L-division of the curve is generated.

The intrinsic image of the curve reveals discrete geometry structure of the curve, and provides an effective analysis tool for generating its L-division.

In the present invention, the L-division of the curve is constructed point-by-point through lead-points, comprising steps are as follows.

For the curve, such as the arc, the start-point of the arc is as the basic lead-point (briefly denoted by the basic-point), to determine an image in the neighborhood of the basic-point as the lead-point according to a optimization goal (for example, the discrete error minimum or shortest distance), and to calculate the coordinate value increment (briefly denoted by the increment) between the lead-point and the basic-point; to generate the neighborhood of the lead-point, and to determine the next lead-point in the neighborhood, and again to calculate the increment between the next lead-point and the basic-point; once reaching the intrinsic image, the intrinsic image is the end of the first micro-segment of the arc, the increment between the intrinsic image and the basic-point is the increment of the micro-segment; then the intrinsic image is as the new basic-point of the second micro-segment, the increment of the second micro-segment is generated until the end point of the arc, and the intrinsic L-division of the arc meet the optimization goal is gained.

In the above steps, it is necessary to judge whether each lead-point for the intrinsic image. The judgment method is: generating the increment between the (i+1)-th lead-point and the basic-point, and generating the line-segment between the (i+1)-th lead-point and the basic-point according to the orientation of the curve; for that segment curve between the (i+1)-th lead-point and the basic-point, judging whether the line-segment for a micro-segment of the curve, if is yes, then continuing to generate next lead-point; if is not, then the lead-point is the intrinsic image.

For each curve in the k curves, in accordance with the planned cutting path in the step 1024, sequentially repeating the above procedure to generate the intrinsic L-division of the tool-path.

The concrete steps are used to generate the intrinsic L-division of a tool-path as follow:

Step (1031): setting optimization goals for a curve to taken out from the K curves in sequence;

Step (1032): generating the neighborhood of the start-point of the curve, therein the start-point is defined the basic-point;

Step (1033): determining a lead-point in the neighborhood of the basic-point according to the optimization goals, and to calculate a coordinate value increment between the lead-point and the basic-point;

Step (1034): generating the line-segment between the lead-point and the basic-point;

Step (1035): judging whether the line-segment for a micro-segment of the curve;

Step (1036): if the line-segment is the micro-segment of the curve, then to return to the step (1033), and to generate next lead-point;

Step (1037): if the line-segment is not the micro-segment of the curve, then the previous lead-point of the lead-point is the end-point of the micro-segment, and the coordinate value increment that is between the previous leading-point and the basic-point is the increment of the micro-segment;

Step (1038): setting the previous lead-point as the basic-point of the next micro-segment, and generating the next micro-segment by executing the step (1032) to the step (1037) repeatedly in sequence, until generating the intrinsic L-division of the curve.

For all curves in the k curves, to repeat steps (1031) to step (1038), and to generate the L-divisions, which satisfy the optimization goals.

In the above step (1035), so as to judge whether the line-segments for a micro-segment of the curve, the existing technology need to calculate the largest normal distance between the line-segments and the curve, and judge whether the largest normal distance is less than or equal to the discrete error. However, the existing technology referred the curve-segment as the Euclidean curve, it is necessary to produce non-Euclidean error.

Due to the union of the neighborhoods of all lead-points is the neighborhood of the curve, therefore, at the orientation of the tool-path, if the neighborhood of the line-segment is a subset of the neighborhood of the curve, then the line-segment is the micro-segment of the curve.

The present invention is based on the discrete geometry structure of the tool-path, and eliminated the non-Euclidean errors by comparing the neighborhood of the line-segment with the neighborhood of the curve, and judging whether the line-segment is a micro-segment of the curve.

The existing technology regards a tool-path as an Euclidean curve, and constructs L-division of the tool-path by straight-lines with equal step, straight-lines with equal program segment, and straight-lines with equal error according to the mathematical expression of the tool-path. However, due to the feed directions of the axes are constrained, the space is loss of isotropy, and is no longer a Euclidean space, and resulted the symmetry breaking, the tool-path is no longer an Euclidean curve. Secondly, in the existing CNC systems, many optimization algorithms cannot be used because of the limitation of the interpolation period. The existing technology is based on the Euclidean space, there is no the concept of intrinsic L-division, therefore the L-division must not optimal.

Based on the discrete geometry structure of the tool-path, the present invention generates the intrinsic L-division of the tool-path, and eliminated of non-Euclidean errors of the tool-path. On the other hand, the intrinsic L-division of the tool-path is the upper bound of its all L-divisions, and thus in the intrinsic L-division of the tool-path, the number of micro-segment is at least, i.e. inflection point in the intrinsic L-division is at least. In accordance with optimization goals such as the shortest distance, the smallest discrete error, and the optimization of tolerance and fit, the lead-points are used to point-by-point guide, and generated the L-division satisfies optimization goals.

Therefore, in the present invention, the L-division satisfies the optimization goals, eliminated non-Euclidean errors of the tool-path, and completely solved the optimization problem of discrete position information.

In addition, for the DRC-based control-machine, from the Table 2 and Table 3 can be clearly seen that real-time control of process parameters is no essential differences with real-time control of axes, the switch to control the process parameters is regarded as a virtual axis, the parameter values as the values of the virtual axis, and the real-time control of axis is unified with the real-time control of process parameters, known as multi-axis and multi-parameter linkage. Therefore, in the present invention, the axes include the virtual axis.

4. The Discrete Kinematics Planning (104)

The discrete kinematics planning (104) is used to generate the T-division for the intrinsic L-division.

If a tool-path is a continuous curve, such as an arc, the tool-path is discreted as micro-segments $\Delta L_1, \ldots, \Delta L_n$. Jumps of F between the micro-segments $\Delta L_1, \ldots, \Delta L_n$ (briefly denoted by jumps) are certainly occurred, this is due to the intrinsic properties of the discrete movement. The range of the jumps reflects the axis smoothness.

For each micro-segment of $\Delta L_1, \ldots, \Delta L_n$, implementation of the acceleration/deceleration control can reduce the jumps. Obviously, this will cause the axes frequently to accelerate or decelerate, and to reduce the machining quality and machining speed. So to keep the jumps in the appropriate range can significantly improve machining quality and machining speed. It is an important technique for high-speed and high-precision machining Therefore, when machining a continuous tool-path with F, the basic task of the discrete kinematics planning is to plan F of relevant axes during $\Delta t_i$, and to keep the jumps in the appropriate range, so to determine T-division and L-division.

Obviously, for F given by a user, the T-division depends on the discrete geometric structure of the tool-path and the dynamic characteristics of the drive-axis y, including its maximum acceleration $a_{max,y}$, the time equivalent $E_t$ of a motion control system and so on.

For all micro-segments $\Delta L_i$ to find $F_{i,y}$ according to the slope of $\Delta L_i$ and F, and to obtained the T-division $\Delta t_i (i=1, \ldots, m)$ according to $\Delta t_i = \Delta L_{i,y}/F_{i,y}$, where m=n−1, and n is the number of the micro-segments.

The jump is the intrinsic property of the discrete movement. Thus, in order to make the jumps to keep in the appropriate range, it is necessary to adjust the T-division and the L-division.

Let the tool-path is a counterclockwise arc with radius r in the first quadrant, its start-point is at the x-axis with coordinate (r, 0), its end-point is a feature point with coordinate $(r/\sqrt{2}, r/\sqrt{2})$. From the beginning to the feature point, the linkage-axis (x) is accelerated gradually from 0, its amount of feed is approximately 0.3r, and the drive-axis (y) is gradually decelerated from the maximum, its amount of feed is approximately 0.7r, the two are equal at the feature point. The amount of feed of the drive-axis (y) is roughly 2.3 times the amount of feed of the linkage-axis (x).

From the start-point to the feature-point, the feedrate of the linkage-axis (x) is gradually increased from 0 to 0.7 F, the total change is approximately 0.7 F, the feedrate of the drive-axis (y) is gradually decreased from F to 0.7 F, the total change is approximately 0.3 F. Therefore, the change of the feedrate of the linkage-axis (x) is roughly 2.3 times the change of the feedrate of the drive-axis (y).

From the start-point to the feature-point, the drive-axis (y) is decelerated from F, the linkage-axis (x) is accelerated from the static, the feedrate of the linkage-axis (x) and the drive-axis (y) is equal $F/\sqrt{2}$ at the feature-point.

The feedrate of the drive-axis (y) is started from F, after m jumps, is reached $F/\sqrt{2}$, the average of the jump is $(F-F/\sqrt{2})/m$ for each jump, denoted by $\Delta F_y$.

The feedrate of the linkage-axis (x) is started from the static, after m jumps, is reached $F/\sqrt{2}$, the average of the jumps is ($F/\sqrt{2}$ m), denoted by $\Delta F_x$.

Let the tool-path is a counterclockwise arc in the first quadrant, the start-point of the micro-segment $\Delta L_i$ is ($x_i$, $y_i$), the end point is ($x_{i+1}$, $y_{i+1}$). The feedrate of the y-axis is $F_{i,y}=\Delta L_{i,y}/\Delta t_i$ during $\Delta t_i$, and is $F_{i+1,y}/\Delta L_{i+1,y}/\Delta t_{i+1}$ during $\Delta t_{i+1}$. The feedrate of the y-axis produced negative jumps at the point ($x_{i+1}$, $y_{i+1}$), its value is $\Delta F_{i+1,y}=F_{i,y}-F_{i+1,y}$.

Similarly, the feedrate of the x-axis produced positive jumps at the point ($x_{i+1}$, $y_{i+1}$), its value is $\Delta F_{i+1,x}=(F_{i+1,x}-F_{i,x})$.

For the L-division $\Delta L_1$, . . . , $\Delta L_n$ of the tool-path, from the start-point to the end-point, the y-axis produced m jumps, where m=n−1. The feedrate of the y-axis at the start-point and the end-point is denoted as $F_{s,y}$ and $F_{e,y}$. The reference value of $\Delta F_y$, in general, is estimated by $F_{s,y}-F_{e,y}$)/m. Similarly, the reference value of $\Delta F_x$ is estimated by ($F_{e,x}-f_{s,x}$)/m.

The axis smoothness means that the deviations of $\Delta F_{i+1,x}$ and $\Delta F_{i+1,y}$ are in a given range of the reference values of $\Delta F_x$ and $\Delta F_y$.

The deviations of $\Delta F_x$ and $\Delta F_y$ is denoted by $\delta_x$ and $\delta_y$, the constraints on the axis smoothness is expressed as:

$$(\Delta F_{i+1,x}-\Delta F_x)\leq \delta_x, (\Delta F_{i+1,y}-\Delta F_y)\leq \delta_y.$$

The reference values of $\Delta F_x$ and $\Delta F_y$, and their deviations are from experience, and are dependent on the machining process, specially, when high-speed and high-precision machining. The reference value of $\Delta F_x$ and $\Delta F_y$, and $\delta_x$ and $\delta_y$ are set by a user based on actual experience.

For the arc, $\Delta F_x$ is approximately 2.3 times $\Delta F_y$, thus the reference value of $\Delta F_x$ is about 2.3 times the reference value of $\Delta F_y$. This is endogenous constraint of the arc.

The axis smoothness is dependent on the capability of the motion control system, such as the maximum speed $F_{max}$ and the maximum acceleration $a_{max}$ of the axis, the time constant $\tau$ of the motion control system, and other factors. Because of F is constrained by $F_{max}$ and $a_{max}$, the axis smoothness is mainly dependant on $\tau$. Secondly, the axis smoothness is also dependent on the machining process.

In the existing open CNC systems, motion planning is called the feedrate look-ahead control. In order to reduce the jumps, the so-called feedrate look-ahead control is used to plan F for up to 1000 to 5000 NC program segments when interpolating. The feedrate look-ahead control is one of the key technologies in the existing open CNC systems.

In the motion planning, the existing technology to totally ignore the discrete geometry characteristics and the discrete kinematics characteristics of the tool-path, there is no concept of the intrinsic L-division, there is also no concept of the drive-axis and the linkage-axis.

In the motion planning, the existing technology is totally ignored the non-Euclidean errors of the tool-path.

For the existing CNC systems, the time is discrete equal intervals $\Delta t_i$ (i=1, . . . , m) by the interpolation period T, where all $\Delta t_i$ is equal to the interpolation period T. In the i-th interpolation period, to calculate $\Delta L_{i+1}$ according to the formula $F=\Delta L_{i+1} \times T$, to calculate $F_{i+1,x}$ and $F_{i+1,y}$ according to F and the slope of $\Delta L_{i+1}$; then to calculate the (i+1)-th increments $\Delta L_{i+1,x}$ and $\Delta L_{i+1,y}$, and to output in real-time to the x-axis and y-axis motion control systems, as given values of the position loop of the x-axis and y-axis in the (i+1)-th period.

The iterative interpolation control method all tightly coupled together such as $e_r$, r, T, and F. The feedrate look-ahead control must be in real-time, it resulted in extremely complex motion planning, and cost a lot of the computational resources of hardware and software. For iterative interpolation control method, on the other hand, the time is locked by the interpolation period, only $\Delta L_i$ can adjusted, $\Delta t_i$ cannot adjusted. It is difficult to achieve optimization of axis smoothness.

In the present invention, based on the discrete geometry and discrete kinematics characteristics of the tool-path, an optimization discrete kinematics planning is proposed.

The technical solution is as follows.

Discrete geometry structure of the tool-path depends only on the components $\Delta L_{i,x}$ of the linkage-axis (x) in the intrinsic L-division. At the same time, due to the non-coupling relationship of the space structure and time structure of the related data flow, the intrinsic L-division of the tool-path is independent on F.

For the intrinsic L-division of the tool-path, the component $\Delta L_{i,x}$ of the linkage-axis (x) at the point ($x_i$, $y_i$) is the structure factor, that is, at the point ($x_i$, $y_i$), the structure factor $G_{x,i}$ of the linkage-axis (x) determine the upper limit for the micro-segment $\Delta L_i$, $\Delta L_{i,x}$ can only reduced and cannot increased. The intrinsic L-division of the tool-path is the upper limit of all L-divisions. Thus, for a given $\Delta t_i$, the intrinsic L-division determines a upper limit of F.

In the present invention, the basic problem and the technical characteristics of the discrete kinematics planning are that when machining a continuous tool-path, for a given F and a given too-path, first to check the smoothness of the drive-axis to adjust the F according to the intrinsic L-division of the too-path, and to generate the T-division according to the adjusted F; next to check the smoothness of the linkage-axis based on the structure factor of the linkage-axis, and to generate the L-division and the T-division of the tool-path.

1) checking F given by a user
F given by a user must satisfy the following constraint conditions:

$$F \leq F_{max,x}, F \leq F_{max,y}, \quad (1)$$

$$E_t \leq \Delta t_{min}, \quad (2)$$

$$\Delta Fx \leq a_{max,x} \times \Delta t_{min}, \Delta F_y \leq a_{max,y} \times \Delta t_{min} \quad (3)$$

where $F_{max,x}$ and $F_{max,y}$ are maximum of $F_x$ and $F_y$, $a_{max,x}$ and $a_{max,y}$ are maximum of the accelerations $a_x$ and $a_y$, $E_t$ is maximum in the time equivalents of the x-axis and y-axis servo motion control systems, $\Delta t_{min}$ is the minimum in $\Delta t_i$ (i=1, . . . , m).

The above constraint conditions are external constraints, which are completed by the man-machine interface.

2) checking the axis smoothness, and generating the L-division and the T-division of the tool-path
  a) setting constraint conditions of the axis smoothness
To set reference value of $\Delta F_x$, and $\Delta F_y$, and to set their deviation $\delta_x$ and $\delta_y$.

The constraint conditions of the axis smoothness can be expressed as:

$$(\Delta F_{i+1,x}-\Delta F_x)\leq \delta_x, (\Delta F_{i+1,y}-\Delta F_y)\leq \delta_y.$$

b) generating the L-division and the T-division of the tool-path
For N micro-segments $\Delta L_1$, . . . , $\Delta L_n$ in the L-division, to calculate $F_{i,y}$ and $F_{i,x}$ from F and the slope of $\Delta L_i$, to generate the T-division $\Delta t_i$ (i=1, . . . , m) according to $\Delta t_i = \Delta L_{i,y}/F_{i,y}$ and $\Delta t_i \geq \Delta t_{min}$.

c) checking the axis smoothness of the drive-axis (y)

For N micro-segments $\Delta L_1, \ldots, \Delta L_n$, to check the constraint condition (a) of the axis smoothness of the drive-axis (y):

$$(\Delta F_{i+1,y} - \Delta F_y) \leq \delta_y;$$

If the constraint condition (a) does not satisfied, then to adjust F in order to satisfy the constraint (a), and to re-plan the T-division $\Delta t_i$ (i=1, ..., m) according to the adjusted F.

d) checking the axis smoothness of the linkage-axis (x)

Let $\Delta L_i$ is a planned micro-segment. Thus, for micro-segment $\Delta L_{i+1}$, it should be to check the jump $\Delta F_{i+1,x} = (F_{i+1,x} - F_{i,x})$ of the linkage-axis (x) at the point $(x_{i+1}, y_{i+1})$.

The constraint condition (b) of the axis smoothness of the linkage-axis (x) at the point $(x_{i+1}, y_{i+1})$ is:

$$(\Delta F_{i+1,x} - \Delta F_x) \leq \delta_x.$$

For $\Delta L_{i+1}$, if the constraints condition (b) does not satisfied, the first to increase $\Delta t_{i+1}$ in order to reduce $F_{i+1,x}$ and then to reduce $\Delta L_{i+1,x}$ in order to reduce $F_{i+1,x}$, to increases $\Delta t_{i+1}$ and to reduce $\Delta L_{i+1,x}$ can be repeated, until the constraint condition (b) is satisfied.

And then to calculate $\Delta L_{i+1,x}$ and $L_{i+1,y}$, and to adjust $\Delta t_{i+1}$ and $\Delta L_{i+1}$. The end-point of $\Delta L_{i+1}$ regards as a new basic-point, that part of the curve between the new basic-point and the end-point of the curve is re-planned to generate the L-division and the T-division, until arriving the end-point of the curve.

For each curve in the k curves, repeating the above steps to generate the L-division and the T-division of the curve for the optimization of the axis smoothness.

In the present invention, the discrete kinematics planning is independent of an algorithm to generate the L-division, and is also independent of real-time operating systems. On the other hand, Formula $F_i = \Delta L_i \times \Delta t_i$ shows that computer-aided is used in the present invention, F is repeatedly adjusted from both of $\Delta L_i$ and $\Delta t_i$, and the L-division and the T-division is repeatedly adjusted, thereby optimization of the axis smoothness is achieved.

In the present invention, the computer-aided discrete kinematics planning is simple, flexible and fully open.

FIG. 5 illustrates a flow chart of the discrete kinematics planning.

The discrete kinematics planning is comprising the steps of:

Step (1) checking F given by a user

Step (1-1) checking constraint condition (1)

$$F \leq F_{max,x}, F \leq F_{max,y};$$

if the constraint condition (1) is not satisfied, then to reduce F to satisfy the constraint condition (1);

Step (1-2) setting the minimum of $\Delta t_i$ according to the constraint condition (2)

$$E_t \leq \Delta t_{min};$$

Step (1-3) checking the $\Delta t_{min}$ to satisfy the following condition (3) according to $\Delta F_x$ and $\Delta F_y$ given by a user $$\Delta F_x \leq a_{max,x} \times \Delta t_{min}, \Delta F_y \leq a_{max,y} \times \Delta t_{min};$$

if the constraint condition (3) is not satisfied, then to reduce F to satisfy the constraint condition (3).

The constraint conditions (1), (2) and (3) are external constraints, which are completed by the man-machine interface.

Step (2) generating an intrinsic L-division for a curve in the K curves by executing the discrete geometric planning (103), therein the intrinsic L-division satisfies the optimization goals;

Step (3) generating the T-division of the intrinsic L-division by calculating $F_{i,y}$ according to F and the slope of $\Delta L_i$ to generate $\Delta t_i$, therein $\Delta t_i = \Delta L_{i,y}/F_{i,y}$ and $\Delta t_i \geq \Delta t_{min}$;

Step (4) setting reference values of $\Delta F_x$ and $\Delta F_y$, and setting their deviations $\delta_x$, $\delta_y$;

Step (5) checking constraint condition (a) of the axis smoothness for the drive-axis (y)

$$(\Delta F_{i+1,y} - \Delta F_y) \leq \delta_3;$$

if the constraint condition (a) does not satisfied, then to adjust F, and to re-plan a T-division according to the adjusted F;

Step (6) checking constraint condition (b) of the axis smoothness for the linkage-axis (X)

$$(\Delta F_{i+1,x} - \Delta F_x) \leq \delta_x;$$

if the constraint condition (b) does not satisfied, then to increase $\Delta t_{i+1}$ in order to reduce $\Delta F_{i+1,x}$, so that the constraint condition (b) is satisfied; if increasing $\Delta t_{i+1}$ can also not satisfy the constraint condition (b), and then to reduce the $\Delta L_{i+1,x}$ in order to reduce $\Delta F_{i+1,x}$, so that the constraint condition (b) is satisfied;

Step (7) calculating $\Delta L_{i+1,x}$ and $\Delta L_{i+1,y}$ to adjust $\Delta t_{i+1}$ and $\Delta L_{i+1}$;

Step (8) setting the end-point of $\Delta L_{i+1}$ as the basic-point of $\Delta L_{i+2}$, and executing the step (2) to the step (7) for the curve, until arriving the end-point of the curve; and Step (9) executing, repeatedly in sequence, the step (2) to the step (8) for each curve in the K curves.

In the step (6), to increase $\Delta t_{i+1}$ and to reduce $\Delta L_{i+1,x}$ can be repeated many times.

5. The Related Data Flow File Planning (105)

The related data flow file planning (105) is used to generate a linkage-table file for the intrinsic L-division and a follow-table file for the T-division in a storage space by a given data format, and to link the both as the related data flow file by a given data format.

Compensation of the deterministic and quasi-deterministic errors is necessary in CNC systems. The deterministic errors in a mechanical system are included such as the backlashes between the transmission chains, the pitch errors, the thermal deformation errors and so on. Based on the deterministic errors in the mechanical system, the related data flow file planning module modifies the linkage-table and the follow-table, and compensates the deterministic errors.

In the existing CNC systems, the acceleration/deceleration control is a key technology, the acceleration/deceleration control modules become an important part of the interpolation module.

In fact, the so-called acceleration/deceleration control is only to F of some axes, i.e. linear movements of the axes. When machining the straight-line, where does not exist the jump of F. Thus, the acceleration/deceleration control is only to plan F according to the machining process, that is, to choose the appropriate acceleration/deceleration curves, such as the conventional parabolic S-curve and trigonometric S-curve.

The existing acceleration/deceleration control is real-time, which is controlled by the real-time operating system, only the micro-segment can be adjusted, thus the acceleration/deceleration control is difficult to refine.

In the present invention, the acceleration/deceleration control is only a special case of the discrete kinematics planning. For acceleration/deceleration control of a straight line, it is only necessary to determine input parameters such as F in uniform, F before acceleration, F after deceleration.

According to the parameters, the straight line is divided into the uniform segment, the acceleration segment and the deceleration segment, which is used to determine the end-point of the acceleration and the start-point of the deceleration. According to the given optimization goals, some appropriate acceleration/deceleration curves are selected. The discrete kinematics planning is executed for the acceleration segment and the deceleration segment of the straight line, and the linkage-table and the follow-table of the acceleration segment and the deceleration segment are generated in a storage space, thus the acceleration/deceleration control of the straight line is completed.

Thus, the present invention converted acceleration/deceleration control to conventional technique in the discrete kinematics planning. On the other hand, in the present invention, F is planned from the two aspects of the L-division and the T-division, and the refinement of the acceleration/deceleration control is realized.

Non-Orthogonal Discrete Coordinate System Planning

The orthogonal coordinate system generally is used in a mechanical system. The axes in the orthogonal coordinate system are mutual vertical, for example, the Cartesian coordinates system, the polar coordinate system and so on. High-precision machining demands high verticality and parallelism between axes. In the process of installation and adjustment of a machine tool, using the test tools such as the spirit level, the standard cubic feet, the flat feet, and collimator, the components of adjustment repeatedly are adjusted to ensure the verticality and the parallelism between axes. This requires the high-precision components of adjustment and the high precision instrument of adjustment, as well as rich experience in the adjustment and perfect technical solutions. For DRC, verticality and parallelism are no longer position errors of the machine tool, but system parameters of the coordinate system such as the axis travel. Therefore, the DRC is used the non-orthogonal coordinate system to eliminate non-verticality and non-parallelism.

A coordinate system, which in axes are mutual non-vertical, is called the non-orthogonal coordinate system.

To keep discrete scale, the vertical axes and equidistance lines in the orthogonal discrete coordinate system are changed non-vertical according to the non-verticality, and the non-orthogonal discrete coordinate system is established.

For the non-orthogonal discrete coordinate system, the above step (101) is different.

Step (101)a. Non-orthogonal discrete coordinate system planning

Clicking "non-orthogonal discrete coordinate system", when the page "orthogonal/non-orthogonal discrete coordinate system" is popped up;

Clicking sub-item "system parameters" in the page "non-orthogonal discrete coordinate system", the pull-down menu "discrete scale" and "non-verticality" are popped up;

In "discrete scale", determining a discrete scale of the non-orthogonal discrete coordinate system, for example, the discrete scale is 0.01 mm, or 1 μm, or 1 nm for a linear axis, the discrete scale is 1°, or 1' for a rotation axis.

In "non-verticality", inputting non-verticality between axes.

There are many windows in the page "orthogonal/non-orthogonal discrete coordinate system", such as "too-path planning", "discrete geometry planning", "discrete kinematics planning", "related data flow file planning", "control flow file planning", "data control flow file planning", "miscellaneous function planning", and so on.

Step A. Clicking "orthogonal/non-orthogonal discrete coordinate system planning", to generate the orthogonal discrete coordinate system or the non-orthogonal discrete coordinate system;

Step B. Clicking "too-path planning", to generate the tool-path file;

Step C. Clicking "discrete geometry planning", to generate the intrinsic L-division $\Delta L_1, \ldots, \Delta L_n$ of the tool-path in accordance with the set of optimization goals;

Step D. Clicking "discrete kinematics planning", to generate the T-division $\Delta t_i$ (i=1, ..., n) of the tool-path;

Step E. Clicking "control flow file planning", to plan a control flow to control switch devices (the tool magazine and other switches), and to generate the control flow file Step F. Clicking sub-item "related data flow file" in the page "data control flow file", to generate the related data flow file of the tool-path;

Step G. Clicking sub-item "error compensation" in the page "data control flow file", to correct the related data flow file, and to compensate deterministic and quasi-deterministic errors;

Step H. Clicking sub-item "data control flow file planning" in the page "data control flow file", to link the related data flow file with the control flow file, to generate the data control flow file of the tool-path;

Step I. Clicking "miscellaneous function planning", to generate control flow instructions, which are used to operate miscellaneous functions.

The basic task of the computer-aided control is to manufacture digital control information, therein the core is to plan the L-division and the T-division of a tool-path. The discrete geometry programming is used to solve the linkageness of the related data flow, and to generate the L-division of the tool-path; the discrete kinematics planning is used to solve the followness of the related data flow, and to generate the T-division of the tool-path. Therefore, the computer-aided control method and system proposed by the present invention achieved the software implementation of CNC technology, and established an open platform for R&D of CNC technology and reconfigure of CNC system.

While the principle of this invention has been described with particularity, as an example of the two axes system, it will be obvious to those skilled in the art that the present invention can apply to the triaxial and even multi-axis system, and also can apply to the step-type related data flow. It is therefore to be understood that various changes, modifications, and substitutions may be incorporated in such embodiment without departing from the spirit and the scope of the invention as defined by the following claims.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

I claim:

1. A computer-aided numerical control method, comprising:

related data flow file planning to be used to manufacture a related data flow file, wherein the related data flow file is used to manufacture digital control information of a tool path; the digital control information comprise a L-division and a T-division of the tool path; the L-division is a increment-type related data flow, the increment-type related data flow is a sequence of consecutive micro-segments, a maximum normal distance from the tool path to each micro-segment is less than or equal to a discrete scale; the T-division is a sequence of consecutive time intervals; the L-division is used to control relevant axes to produce required synthetic displacements, the T-division is used to control a time interval between two consecutive synthetic displacements, which is a control of a feedrate (F);

the related data flow file planning further comprising:

discrete coordinate system planning, to be used to establish a discrete coordinate system by griding a coordinate plane of the discrete coordinate system by a set of equidistance lines, wherein a distance between the lines is equal to the discrete scale;

tool-path planning, to be used to divide the tool-path into multiple segments according to feature points of the tool-path, to determine a drive-axis (y) and a linkage-axis (x) for each segment of the tool-path, and to generate a tool-path file; a coordinate value of the segment of the drive-axis (y) is larger than a coordinate value of the segment of the linkage-axis (x); the feature points are points at which the drive-axis or the linkage-axis change a drive or linkage attribute;

discrete geometry planning, to be used to generate an intrinsic L-division of the tool-path in the tool-path file; the intrinsic L-division is a supremum of the L-division;

the discrete geometry planning further comprising the steps of:

(1031) setting an optimization goal for a first segment; the optimization goal is one of three goals including a shortest distance, a smallest discrete error, and an optimization of tolerance and fit;

(1032) generating a neighborhood of a basic-point in the discrete coordinate system, wherein the basic-point is a start-point of the first segment, the neighborhood is all images of the basic-point at allowed feed directions, each image is a lattice-point which distance from the first segment is less than or equal to the discrete scale;

(1033) determining a lead-point in the neighborhood of the basic-point according to the optimization goal, and generating a coordinate value increment between the lead-point and the basic-point;

(1034) generating a line-segment between the lead-point and the basic-point;

(1035) generating the neighborhood of the line-segment at the allowing feed directions; and judging whether the neighborhood of the line-segment is a subset of the neighborhood of the first segment; if the neighborhood of the line segment is the subset, then the line-segment is the micro-segment of the first segment; the neighborhood of the line-segment is a set of images of all lattice-points at the line segment; the neighborhood of the first segment is a set of images of all lattice-points at the first segment;

(1036) if the neighborhood of the line segment is the subset, returning to the step (1033) and generating a next lead-point;

(1037) if the line segment is not the subset, then a previous lead-point of the lead-point is an end-point of a first micro-segment of the first segment, and the coordinate value increment between the previous lead-point and the basic-point is the coordinate value increment of the first micro-segment;

(1038) setting the previous lead-point as a new basic-point, and generating a next micro-segment of the first segment by executing the step (1032) to the step (1037), until generating the intrinsic L-division of the first segment, wherein the intrinsic L-division satisfies the optimization goal;

(1039) executing the step (1031) to the step (1038) for a second segment and all subsequent segments of the tool-path file, until generating the intrinsic L-division of the tool-path, wherein the intrinsic L-division satisfies the optimization goals; and discrete kinematics planning, to be used to generate the T-division for the intrinsic L-division; for a given F and a given tool-path, first to check a smoothness of the drive-axis to adjust the F according to the intrinsic L-division of the tool-path, and to generate the T-division according to the adjusted F; next to check a smoothness of the linkage-axis axis based on a structure factor of the linkage-axis, and to generate the L-division and the T-division of the tool-path;

the discrete kinematics planning further comprising the steps of:

calculating corresponding time intervals for all micro-segments of the intrinsic L-division based on the F; and adjusting the value of the time intervals as many times as desired, and simultaneously or separately adjusting the length of the micro-segments as many times as desired to meet the smoothness of the drive-axis and the smoothness of the linkage-axis;

and related data flow file planning, to be used to generate a linkage-table and a follow-table of the tool-path, the linkage-table is used to store the L-division adjusted by the discrete kinematics planning, the follow-table is used to store the T-division planned by the discrete kinematics planning and to merge the linkage-table and the follow-table as the related data flow file.

2. The method of claim 1, wherein the discrete kinematics planning (104) further comprises:

(1041) checking the feed-rate (F) given by a user;

(1042) for the micro-segments of the intrinsic L-division, denoted by $\Delta L1, \ldots, \Delta Ln$, calculating all feed-rate components of the drive-axis (y) according to the feed-rate (F) and a slope of $\Delta Li$, where $i=1, \ldots, n$, and generating the T-division of the intrinsic L-division, denoted by $\Delta t1, \ldots, \Delta tm$, based on $\Delta tk = \Delta Lk,y/Fk,y$ and $\Delta tk \geq \Delta tmin$, where $Lk,y$ is drive-axis (y) components of $\Delta Lk$, $Fk,y$ is drive-axis (y) feed-rate components of $\Delta Lk$, $\Delta tmin$ is an allowed minimum of $\Delta tk$, where $k=m$, and $m=n-1$;

(1043) calculating an average feed-rate jump according to the following formulas $$\Delta Fx = (Fe,x - Fs,x)/m$$

and $$Fy = (Fs,y - Fe,y)/m,$$

where $\Delta Fx$ is an average of the feed-rate jump of the linkage-axis(x), $\Delta Fy$ is an average of the feed-rate jump of the drive-axis(y), $Fe,x$ and $Fs,x$ are respectively the feed-rates of the linkage-axis(x) at the start-point and the end-point of the tool-path, $Fs,y$ and $Fe,y$ are respectively the feed-rates of the drive-axis(y) at the start-point and the end-point of the tool-path;

setting allowed deviations $\delta x$ and $\delta y$ of $\Delta Fx$ and $\Delta Fy$;

(1044) For ΔL1, ..., ΔLn, checking a constraint condition of the drive-axis(y) smoothness $$(\Delta F_{i+1,y} - \Delta F_y) \leq \delta_y \quad (a)$$

where ΔFi+1, y is the feed-rate jump of the drive-axis(y) between ΔLi and ΔLi+1;
if the constraint condition (a) is not satisfied, adjusting F, and executing the step (1042) to re-plan the T-division according to the adjusted F;
(1045) calculating the feed-rate jump of the linkage-axis (x) between ΔLi and ΔLi+1: ΔFi+1,x=(Fi+1,x−Fi,x), where Fi,x is the linkage-axis(x) feed-rate of ΔLi, Fi+1,x is the linkage-axis(x) feed-rate of ΔLi+1; ΔFi+1, x is the feed-rate jump of the linkage-axis(x) between ΔLi and ΔLi+1; and checking a constraint condition of the linkage-axis(x) smoothness $$(\Delta F_{i+1,x} - \Delta F_x) \leq \delta_x; \quad (b)$$

if the constraint condition (b) is not satisfied, increasing Δti+1 to satisfy the constraint condition (b); if the constraint condition (b) is not satisfied by increasing Δti+1, reducing ΔLi+1,x to satisfy the constraint condition (b);
(1046) calculating ΔLi+1,x and ΔLi+1,y to adjust Δti+1 and Li+1, where, ΔLi+1,x and ΔLi+1,y are respectively the linkage-axis(x) component and the drive-axis(y) component of ΔLi+1;
(1047) setting the end-point of the adjusted ΔLi+1 as the basic-point of ΔLi+2, and discrete geometry planning based on the step (1032) to the step (1038) for the segment after the basic-point, and executing the step (1042) to the step (1046);
(1048) executing the step (1041) to the step (1047), until generating the T-division of the tool-path.

3. The method of claim 1, wherein the related data flow file planning (105) further comprising:
compensating deterministic errors, to be used to modify the linkage-table and the follow-table according to the deterministic errors of the mechanical system, and to compensate the deterministic errors; the deterministic errors comprise backlashes between transmission chains, pitch errors, thermal deformation errors.

4. The method of claim 1, wherein the number of the axes in the discrete coordinate system is two or more.

5. The method of claim 4, wherein at least one axis is a virtual axis, which is used for real time control for at least a process parameter in a machining process; the virtual axis is regarded as an actual physical axis, a value of the process parameter is regarded as a coordinate value of the physical axis.

6. The method of claim 5, wherein the discrete coordinate system is the non-orthogonal discrete coordinate system.

7. The method of claim 1, wherein the related data flow is a step-type related data flow; the step-type related data flow is a sequence of discrete points, wherein the maximum normal distance between each discrete point and the tool path is less than or equal to the discrete scale.

8. A computer-aided digital control system, comprising:
a hardware platform, a software platform, and an application software system;
the hardware platform and the software platform are based-PC;
the application software system comprising:
a related data flow file planning module, to be used to manufacture a related data flow file, wherein the related data flow file is used to manufacture digital control information of a tool path; the digital control information comprise a L-division and a T-division of the tool path; the L-division is a increment-type related data flow, the increment-type related data flow is a sequence of consecutive micro-segments, a maximum normal distance from the tool path to each micro-segment is less than or equal to a discrete scale; the T-division is a sequence of consecutive time intervals; the L-division is used to control relevant axes to produce required synthetic displacements, the T-division is used to control a time interval between two consecutive synthetic displacements, which is a control of a feedrate (F);
the related data flow file planning module further comprising:
a discrete coordinate system planning module, to be used to establish a discrete coordinate system by griding a coordinate plane of the discrete coordinate system by a set of equidistance lines, wherein a distance between the lines is equal to the discrete scale;
a tool-path planning module, to be used to divide the tool-path into multiple segments according to feature points of the tool-path, to determine a drive-axis (y) and a linkage-axis (x) for each segment of the tool-path, and to generate a tool-path file; a coordinate value of the segment of the drive-axis (y) is larger than a coordinate value of the segment of the linkage-axis (x); the feature points are points at which the drive-axis or the linkage-axis change a drive or linkage attribute;
a discrete geometry planning module, to be used to generate an intrinsic L-division of the tool-path in the tool-path file; the intrinsic L-division is a supremum of the L-division;
further comprising the steps of:
(1031) setting an optimization goal for a first segment; the optimization goal is one of three goals including a shortest distance, a smallest discrete error, and an optimization of tolerance and fit;
(1032) generating a neighborhood of a basic-point in the discrete coordinate system, wherein the basic-point is a start-point of the first segment, the neighborhood is all images of the basic-point at allowed feed directions, each image is a lattice-point which distance from the first segment is less than or equal to the discrete scale;
(1033) determining a lead-point in the neighborhood of the basic-point according to the optimization goal, and generating a coordinate value increment between the lead-point and the basic-point;
(1034) generating a line-segment between the lead-point and the basic-point;
(1035) generating the neighborhood of the line-segment at the allowing feed directions; and judging whether the neighborhood of the line-segment is a subset of the neighborhood of the first segment; if the neighborhood of the line segment is the subset, then the line-segment is the micro-segment of the first segment; the neighborhood of the line-segment is a set of images of all lattice-points at the line segment; the neighborhood of the first segment is a set of images of all lattice-points at the first segment;
(1036) if the neighborhood of the line segment is the subset, returning to the step (1033) and generating a next lead-point;
(1037) if the line segment is not the subset, then a previous lead-point of the lead-point is an end-point of a first micro-segment of the first segment, and the coordinate value increment between the previous lead-point and the basic-point is the coordinate value increment of the first micro-segment;
(1038) setting the previous lead-point as a new basic-point, and generating a next micro-segment of the first segment by executing the step (1032) to the step (1037), until generating the intrinsic L-division of the first segment, wherein the intrinsic L-division satisfies the optimization goal;

(1039) executing the step (1031) to the step (1038) for a second segment and all subsequent segments of the tool-path file, until generating the intrinsic L-division of the tool-path, wherein the intrinsic L-division satisfies the optimization goals;

a discrete kinematics planning module, to be used to generate the T-division for the intrinsic L-division;

for a given F and a given tool-path, first to check a smoothness of the drive-axis to adjust the F according to the intrinsic L-division of the tool-path, and to generate the T-division according to the adjusted F; next to check a smoothness of the linkage-axis axis based on a structure factor of the linkage-axis, and to generate the L-division and the T-division of the tool-path;

further comprising the steps of:

(1041) calculating corresponding time intervals for all micro-segments of the intrinsic L-division based on the F;

(1042) adjusting the value of the time intervals as many times as desired, and simultaneously or separately adjusting the length of the micro-segments as many times as desired to meet the smoothness of the drive-axis and the smoothness of the linkage-axis; and a related data flow file planning module, to be used to generate a linkage-table and a follow-table of the tool-path, the linkage-table is used to store the L-division adjusted by the discrete kinematics planning module, the follow-table is used to store the T-division planned by the discrete kinematics planning module and to merge the linkage-table and the follow-table as the related data flow file.

\* \* \* \* \*